United States Patent
Patel et al.

(10) Patent No.: US 9,027,062 B2
(45) Date of Patent: May 5, 2015

(54) GATEWAY APPARATUS AND METHODS FOR DIGITAL CONTENT DELIVERY IN A NETWORK

(75) Inventors: Vipul Patel, Upper Holland, PA (US); David Chen, Jamison, PA (US); Scott Miller, Doylestown, PA (US); Mehul Shah, Lansdale, PA (US)

(73) Assignee: Time Warner Cable Enterprises LLC, New York, NY (US)

( * ) Notice: Subject to any disclaimer, the term of this patent is extended or adjusted under 35 U.S.C. 154(b) by 1087 days.

(21) Appl. No.: 12/582,619

(22) Filed: Oct. 20, 2009

(65) Prior Publication Data

US 2011/0093900 A1 Apr. 21, 2011

(51) Int. Cl.
| | | |
|---|---|---|
| H04N 7/16 | (2011.01) | |
| H04N 7/173 | (2011.01) | |
| H04N 21/222 | (2011.01) | |
| H04N 21/2343 | (2011.01) | |
| H04N 21/239 | (2011.01) | |
| H04N 21/2665 | (2011.01) | |
| H04N 21/2668 | (2011.01) | |
| H04N 21/472 | (2011.01) | |

(52) U.S. Cl.
CPC ....... *H04N 7/17318* (2013.01); *H04N 21/2221* (2013.01); *H04N 21/2343* (2013.01); *H04N 21/2393* (2013.01); *H04N 21/2665* (2013.01); *H04N 21/2668* (2013.01); *H04N 21/472* (2013.01)

(58) Field of Classification Search
None
See application file for complete search history.

(56) References Cited

U.S. PATENT DOCUMENTS

| | | | |
|---|---|---|---|
| 5,844,552 A | 12/1998 | Gaughan et al. | |
| 6,118,472 A * | 9/2000 | Dureau et al. | 725/109 |
| 7,457,520 B2 | 11/2008 | Rossetti et al. | |
| 7,602,820 B2 | 10/2009 | Helms et al. | |
| 7,787,539 B2 * | 8/2010 | Chen | 375/240.12 |
| 8,015,306 B2 | 9/2011 | Bowman | |
| 8,056,103 B2 * | 11/2011 | Candelore | 725/78 |
| 8,731,053 B2 * | 5/2014 | Karegoudar | 375/240.06 |
| 2001/0050924 A1 * | 12/2001 | Herrmann et al. | 370/493 |
| 2002/0026645 A1 * | 2/2002 | Son et al. | 725/109 |
| 2003/0056217 A1 | 3/2003 | Brooks | |

(Continued)

FOREIGN PATENT DOCUMENTS

WO WO 01/39505 * 5/2001 ............... H04N 7/24

OTHER PUBLICATIONS

MPEG Headers Quick Reference, http://dvd.sourceforge.net/dvdinfo/mpeghdrs.html, Mar. 6 2006.*

*Primary Examiner* — Fernando Alcon
(74) *Attorney, Agent, or Firm* — Gazdzinski & Associates, PC

(57) ABSTRACT

Methods and apparatus for the delivery of digital content in a network. In one embodiment, the digital content comprises internet content received from an Internet host server in a first container format, and converted to a second container format at a headend entity of a cable television or satellite network. The headend entity transmits the re-containerized content to one or more consumer devices, and acts as a gateway device between the consumer devices and various internet content sources. Delivery of internet content from the gateway device can be via broadcast, nPVR, DVR and/or VOD delivery mechanisms. The internet content gateway device is adapted to request, receive and process the internet content. Requests for internet content may be made from either a CPE or the gateway device itself according to one or more rules. The content may also be selectively transcoded before re-encapsulation based on the consumer device capabilities.

33 Claims, 22 Drawing Sheets

(56) References Cited

U.S. PATENT DOCUMENTS

| | | |
|---|---|---|
| 2003/0135860 A1* | 7/2003 | Dureau .......................... 725/82 |
| 2004/0019913 A1* | 1/2004 | Wong et al. .................. 725/139 |
| 2004/0057457 A1* | 3/2004 | Ahn et al. .................... 370/466 |
| 2005/0002418 A1* | 1/2005 | Yang et al. ................... 370/466 |
| 2005/0034171 A1 | 2/2005 | Benya |
| 2005/0047501 A1* | 3/2005 | Yoshida et al. ............... 375/240 |
| 2006/0130107 A1 | 6/2006 | Gonder et al. |
| 2006/0165173 A1* | 7/2006 | Kim et al. ................ 375/240.12 |
| 2007/0022459 A1 | 1/2007 | Gaebel, Jr. et al. |
| 2007/0217436 A1 | 9/2007 | Markley et al. |
| 2008/0137740 A1* | 6/2008 | Thoreau et al. .......... 375/240.12 |
| 2008/0235746 A1 | 9/2008 | Peters et al. |
| 2009/0083279 A1 | 3/2009 | Hasek |
| 2010/0083329 A1* | 4/2010 | Joyce et al. .................... 725/110 |
| 2010/0135646 A1* | 6/2010 | Bang et al. ..................... 386/124 |
| 2010/0251305 A1 | 9/2010 | Kimble et al. |
| 2010/0313225 A1 | 12/2010 | Cholas et al. |
| 2011/0090898 A1 | 4/2011 | Patel et al. |

* cited by examiner

US 9,027,062 B2

GATEWAY APPARATUS AND METHODS FOR DIGITAL CONTENT DELIVERY IN A NETWORK

RELATED APPLICATIONS

This application is related to co-owned U.S. patent application Ser. No. 12/582,653 filed on Oct. 20, 2009 and entitled "METHODS AND APPARATUS FOR ENABLING MEDIA FUNCTIONALITY IN A CONTENT-BASED NETWORK", which is patented as U.S. Pat. No. 8,396,055 on Mar. 12, 2013, and incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data and content-based networks. More specifically, the present invention relates in one exemplary aspect to methods and apparatus for delivering programming content along with internet content via a cable television or satellite network.

2. Description of Related Technology

The proliferation of the Internet and increased connection technologies has contributed to the development of a new media source for information and entertainment. Internet users may post digital video clips (often referred to as "web video") to the Internet, which become accessible to worldwide users. While some video clips are taken from established media sources (including news and sporting events, historical videos, music videos, television programs, film trailers, etc.), community or individual-produced clips are becoming more common. Examples of individual-produced clips may include parodies, home videos, instructional videos, video blogs (often referred to as "vlogs"), etc.

Web videos may be rendered in any number of video formats including for example Flash Video™ (FLV), Windows Media Video™ (WMV), RealMedia™, Quicktime™, and/or DivX™. Generally, Internet users are able to access web videos free of charge, the videos themselves and/or costs for maintaining these on a website is sponsored by advertising revenue at the hosting site. Common web video hosting sites include e.g., Shockinghumor, YouTube™, Google™ Video, MSN™ Video, Yahoo!™ Video, and iPlayer™.

Traditionally, web videos have only been available to users via the Internet, such as via delivery to an Internet capable device (such as a personal computer, laptop computer, or web-enabled telephone or other portable device). In order to receive Internet content (including web videos), "web television" or "IPTV" has previously been necessary.

One such device has been described in U.S. Pat. No. 5,844,552 to Gaughan, et al. issued Dec. 1, 1998 and entitled "Communication of Character Data in a Web Television", incorporated by reference in its entirety herein. As discussed therein, the web television generally includes many of the components of a conventional television, such as a television controller, a video processor, an audio processor, and the like.

However, unlike a conventional television, a web television also includes an internet module, which permits the web television to be used as an on-line access device, and an input device, which permits the user to interface with the internet module and the web television in order to communicate over the internet by way of the web television. Accordingly, a web television may be used in a manner similar to a personal computer in order to gain access to online content providers. When the web television is being used to access Internet content, the television controller transmits messages to the Internet module permitting the internet module to be used in order to communicate over the Internet. In other words, in order to view Internet content on a television, at least an Internet module has been previously required. Thus, legacy televisions and devices may not be utilized to access web clips and other Internet content.

Based on the foregoing, what is needed is a user-friendly mechanism for viewing television content and Internet content (including web videos) which is made available to legacy devices for example in its native format.

Such methods and apparatus would also ideally allow for recording and replaying the Internet content, including using trick mode functions, thus affording the network operator additional advertising and other insertion opportunities.

The ability to transfer the content between various devices in a home or premises network would also be highly desirable.

SUMMARY OF THE INVENTION

The present invention addresses the foregoing needs by providing methods and apparatus for internet content delivery in a network.

In a first aspect of the invention, a method of processing content is disclosed. In one embodiment, the method is useful in a network having a plurality of premises devices in communication therewith, and comprises: generating a list of all of the programs available in a transport stream; extracting information; extracting one or more elementary streams; packetizing the one or more elementary streams using at least a portion of the information; and multiplexing the packetized one or more elementary streams to a transport stream compatible with the premises device.

In one variant, the list further comprises a program number for each of the listed programs.

In another variant, each of the programs comprises an associated packet identifier for each of a plurality of packets associated therewith, the method further comprising generating a list of each packet identifier for each of the plurality of packets associated with individual ones of the programs.

In a further variant, the information comprises header information derived from one or more ISO boxes of an MP4 file, and/or timing information derived from one or more ISO boxes of an MP4 file.

In yet another variant, the act of extracting the one or more elementary streams comprises de-multiplexing and recreating the one or more elementary streams. The de-multiplexing the one or more elementary streams using information contained in one or more ISO boxes of an MP4 file, and recreating the one or more elementary streams comprises adding sync words, sequence headers and picture headers.

In another variant, the method further comprises adding decoding/presentation time stamps (DTS/PTS) and program clock reference (PCR) information.

In still another variant, the multiplexing of the packetized one or more elementary streams comprises multiplexing the packetized elementary streams to MPEG-2 transport streams according to an MPEG-2 buffer and timing model. Multiplexing the packetized one or more elementary streams may also comprise inserting null packets to create at least one constant bitrate (CBR) stream.

In a second aspect of the invention, a gateway apparatus is disclosed. In one embodiment, the apparatus is for use in the delivery of content to one or more of a plurality of consumer premises equipment (CPE) in communication therewith via a delivery network, and comprises: a first interface for communication with the delivery network; a second interface for communication with one or more host servers via an internetwork; and a digital processor in communication with the first and second interfaces and adapted to run at least one computer program thereon. The computer program is configured to: receive the content; process the content for transport over the delivery network; and deliver the processed content to the one or more of the plurality of CPE via the delivery network.

In one variant, the first interface comprises a radio frequency tuner capable of sending and receiving in-band and out-of-band signals, and the computer program is further adapted to receive a request for specific content from at least one of the plurality of CPE and request the specific internet content from the one or more host servers. The request comprises for example a request transmitted to the apparatus via an out-of-band signal, and the delivery of the content comprises delivery via an in-band signal.

In another variant, the computer program is further adapted to request content periodically according to one or more rules. The delivery of the content comprises for example broadcast delivery to more than one of the plurality of CPE simultaneously and according to a predetermined schedule, the schedule being related at least in part on the periodicity.

In yet another variant, the processed content is stored at a storage entity associated with the gateway apparatus, and the computer program is further configured to enable on-demand content delivery functionality of the stored content, the delivery comprising on-demand delivery to at least one of the plurality of CPE. The first network interface is further adapted to enable the apparatus to communicate with at least one session resource manager (SRM), the SRM enabling an on-demand session between the gateway apparatus and at least one of the plurality of CPE for the delivery of content thereto.

In another variant, the processing of the content by the computer program comprises utilizing the computer program to: generate a list of all of the programs available in a first transport comprising the content; extract one or more elementary streams from the first transport; packetize the elementary streams; and multiplex the packetized elementary streams to a second transport, the second transport comprising an encapsulation format usable by one or more of the plurality of CPE. Processing of the content by the computer program further comprises optionally utilizing the computer program to transcode the elementary streams from a first encoding format to a second encoding format, one or more of the plurality of CPE being capable of decoding the second encoding format. The first format comprises e.g., H.264, the second format comprises e.g., one of (i) Real, (ii) Windows Media; and (iii) MPEG-2, and the encapsulation format comprises e.g., MPEG-2.

In a third aspect of the invention, a method for the delivery of Internet content via a hybrid fiber-coaxial (HFC) network is disclosed. In one embodiment, the method comprises: requesting the Internet content from a host server; receiving the requested Internet content via an internet; processing the requested Internet content for transport over the HFC network; and streaming the processed Internet content to at least one premises device via the HFC network.

In one variant, the act of requesting Internet content comprises making Internet content requests according to one or more rules at prescribed periods. The one or more rules includes e.g., at least one of: (i) a time based period for repeating a request; and (i) a criterion for the internet content, and/or may be based at least in part on a profile associated with a requesting premises device.

In another variant, the act of processing the requested Internet content comprises de-encoding the Internet content from a first format, and re-encodinging the de-encoded Internet content to a second format, the second format being particularly selected to be compatible with the one or more of the premises devices. The processing may further comprise multiplexing the re-encoded Internet content into a packetized multi-program (e.g., MPEG-2) transport stream.

In a further variant, the method further comprises establishing a video on-demand (VOD) session for a portal through which the at least one premises device selects the Internet content, wherein the act of streaming the Internet content comprises utilizing the VOD session. The VOD session is re-used for subsequent request from the at least one premises device for new Internet content.

In a fourth aspect of the invention, a method of re-encapsulating internet content from MP4 encapsulation format to MPEG-2 encapsulation format in order to utilize the content on at least one consumer premises equipment (CPE) is disclosed. In one embodiment, the method comprises: receiving a plurality of programs in an MP4 format container; generating a program map table (PMT) and a program association table (PMT) of the programs; extracting information from one or more International Standardization Organization (ISO) boxes of the MP4 container; extracting from the MP4 container a plurality of elementary streams using information contained in one or more ISO boxes of the MP4 container; encapsulating the elementary streams into a packetized format suitable for MPEG-2 transmission, the encapsulation comprising utilizing the extracted information to add sync words, sequence headers and picture headers; multiplexing the packetized elementary streams into an MPEG-2 multiple program transport stream; and delivering the MPEG-2 transport stream to the at least one CPE.

In one variant, the MP4 container is received via the Internet from at least one host server.

In another variant, the internet content comprises H.264-encoded video content and advanced audio coding (AAC) encoded audio content.

In a fifth aspect of the invention, a method of processing content rendered in a first format is disclosed. In one embodiment, the method comprises: determining whether a target premises device is of a first configuration; if the determining indicates that the target device is of the first configuration, then: de-encoding the content from the first format; re-encoding the content in a second, different format; and encapsulating the re-encoded content in a container scheme for transport over a network.

In one variant, the first format comprises H.264, the second format comprises one of: (i) Real, (ii) Windows Media; and (iii) MPEG-2, and the container scheme comprises MPEG-2. The method further comprises transporting the encapsulated re-encoded content over the network via a multiplexed multiple program transport stream (MPTS) to the target device.

In another variant, the method further comprises de-multiplexing at least a portion of the content from a second container scheme format before the act of de-encoding.

In a sixth aspect of the invention, a method of efficiently transmitting Internet media content over a content delivery network having a plurality of client devices in communication therewith. In one embodiment, the method comprises: obtaining the Internet content rendered in a first format and encoded according to a first encoding scheme; removing the content from the first format; and inserting the content encoded according to the first scheme into a second format for transport over the network to one or more of the client devices. The one or more client devices are configured to: receive the content within the second format; remove the content encoded according to the first scheme; and decode the encoded content for playback thereof.

In one variant, the plurality of client devices comprises legacy client devices and non-legacy devices, the non-legacy devices being adapted to decode the content encoded according to the first scheme, and the first encoding scheme comprises a scheme which is substantially more bandwidth efficient than a second encoding scheme native to the legacy devices. The first scheme comprises e.g., H.264, and the second scheme comprises e.g., MPEG-1 or MPEG-2.

In a seventh aspect of the invention, a method of processing content, including selectively transcoding the content based on determined CPE configuration, is disclosed.

In an eighth aspect of the invention, a network architecture including an internetworking gateway adapted to deliver digitally encoded content from a web server or other source via one or more RF QAMs is disclosed.

In a ninth aspect of the invention, CPE adapted for use with the aforementioned internetworking gateway is disclosed. In one embodiment, the CPE comprises software adapted to communicate with the gateway in order to request and receive internet content encapsulated via the native network delivery transport (e.g., MPEG-2), and transcoded as necessary.

In a tenth aspect of the invention, computer readable apparatus comprising a storage medium is disclosed. In one embodiment, the apparatus comprises a mass storage device having at least one computer program disposed thereon, the at least one program being configured to implement the aforementioned internetworking function.

In an eleventh aspect of the disclosure, a method of re-encapsulating internet content for use on a premises device is disclosed. In one embodiment, the method comprises generating a list of a plurality of programs available in a transport stream; extracting information for use in generating a Moving Picture Experts Group-2 (MPEG-2) header from a data portion of individual ones of a plurality of elementary streams; extracting one or more of the streams, at least one of the elementary streams comprising frameless non-legacy Moving Picture Experts Group-4 (MPEG-4) content; encapsulating the non-legacy MPEG-4 content; packetizing the encapsulated non-legacy MPEG-4 content using a header generated from the extracted information, the header comprising at least sync words, sequence headers and picture headers; and generating a multiplex transport stream comprising the MPEG-2 encapsulated non-legacy MPEG-4 content and legacy MPEG-2 content.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
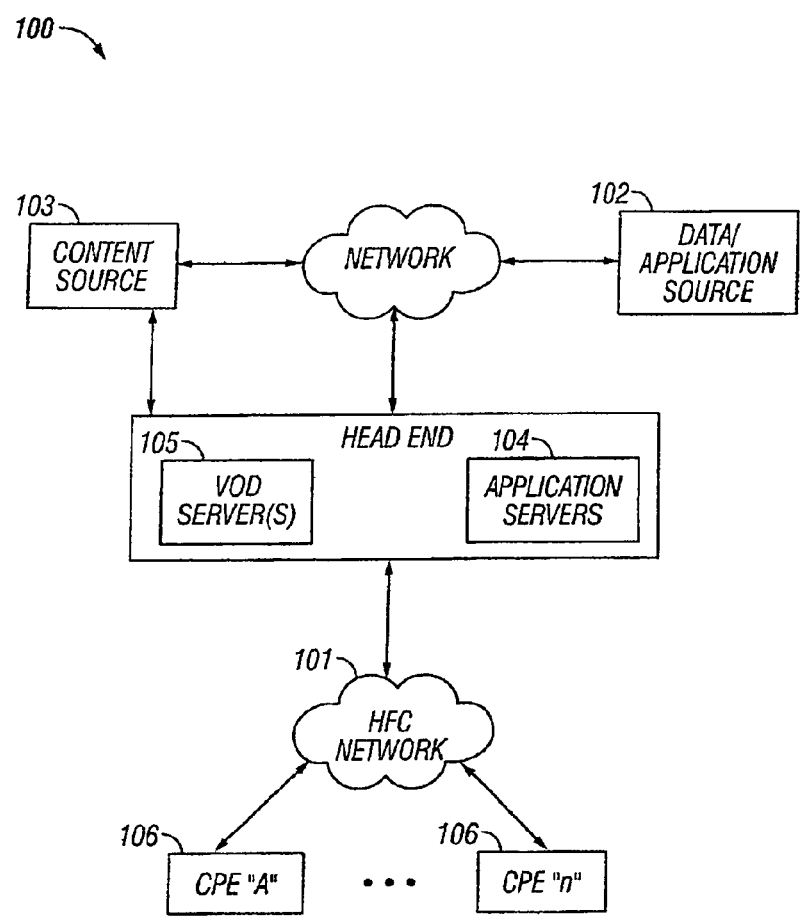
FIG. 1 is a functional block diagram illustrating an exemplary HFC cable network configuration useful with the present invention.

Reference is now made to the drawings, wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, MPEG-4 Part 2, MPEG-4 Part 10, etc.), Real (RealVideo, etc.), AC-3 (audio), DiVX, XViD/ViDX, Windows Media Video (e.g., WMV 7, 8, or 9), ATI Video codec, 11263, H.264, Sorenson Spark, FFmpeg, 3ivx, x264, VP6, VP6-E, VP6-S, VP7, Sorenson 3, Theora, Cinepack, Huffyuv, Lagarith, SheerVideo, Mobiclip or VC-1 (SMPTE standard 421M) families.

As used herein, the terms "container", or "media container file", or "container format", or "file format" refer without limitation to a multimedia (or other data) file or format which specifies the way data is stored within the file. A container format for example may refer to a meta-format in that it stores the real data as well as the information regarding how such data are stored within the file itself. Examples of container formats include without limitation MP4, M4A, M4V, 3GP, AVI, and RealVideo file formats.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. Multiple regional headends may be in the same or different cities.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or out-of band, cable modem, etc.), Wi-Fi (e.g., 802.11a,b,g,n), WiMAX (802.16), PAN (802.15), or IrDA families.

As used herein, the term "node" refers without limitation to any location, functional entity, or component within a network.

As used herein, the term "on-demand" or "OD" is meant to include any service that enables real, quasi-real time (e.g. "trick" mode delivery) or even non-real time delivery of content such as audio and/or video programs at any resolution, or data. Such content may be, for example, stored or temporarily cached on a server, or streamed directly from a source, and may be in response to a user-initiated event, service profile or configuration, headend event, or otherwise.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11a/b/g/n.

Overview

In one salient aspect, the present invention discloses methods and apparatus for internet content delivery in a communications network, such as a cable television or satellite network. In one embodiment, a gateway device is disposed at the headend of the network and is configured to request and receive internet content from one or more host servers via the Internet. The internet content is then processed and delivered to one or more client devices.

Processing of internet content may include de-encapsulating the received internet content from a first media file container format and subsequently re-encapsulating the internet content to a second media file container format which is compatible with one or more receiving devices. For example, content which is delivered from a host server may be encapsulated in e.g., MP4, if the receiving client device(s) are not capable of reading the MP4 files, the gateway device may re-encapsulate to e.g., MPEG-2 or other format that the receiving device is capable of reading. The gateway device may process received content automatically into various alternative encapsulation formats or, may encapsulate as needed to the format of the specific requesting device. The processed content may be stored for future use for transmission to other client devices requesting the same content in the particular new format.

Multiple alternative delivery paradigms are given for the delivery of internet content from the gateway device to the client devices. In one embodiment, internet content is delivered according to traditional broadcast mechanisms (e.g., linear delivery via downstream in-band QAM). According to this mechanism, the gateway device first establishes a set of rules for requesting certain internet content. The content is then pre-processed, and a broadcast schedule is created. Users may then view the internet content by tuning to the appropriate program channel (associated with one or more particular QAMs) at the time designated in the broadcast schedule.

In another embodiment, internet content is delivered using VOD delivery mechanisms. According to this mechanism, a VOD session is established between the user's CPE and an internet content portal associated with the gateway device. At the portal, the user can browse and select internet content for viewing. The gateway device is then able to request selected internet content from a host server associated with the content, process the content as needed, and stream the (processed) content, via the pre-established session, to the user's CPE. In one variant, the same session is utilized for subsequent internet content requests.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system, or over satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

Moreover, while the primary embodiments described herein describe predominantly internet content (such as from e.g., the Internet or other interconnected interworks), other types of content (such as programming content, or instructional videos, musical content or videos, games, emergency warnings or alerts, etc.) can be delivered using the techniques of the present invention.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems. Additionally, the invention is in no way limited to any particular modulation type or medium access scheme, and can be implemented using for example using QAM, orthogonal frequency division multiplexing (OFDM), sigma-delta modulation (SDM), time-division multiplexing (TDM), etc.

Also, while certain aspects are described primarily in the context of the well-known IP or Internet Protocol (described in, inter glia, RFC 791 and 2460), it will be appreciated that the present invention may utilize other types of protocols (and in fact bearer networks to include other internets and intranets) to implement the described functionality.

It will further be appreciated that while the exemplary embodiments presented herein are described in the context of services that may include multicast and unicast data, the present invention is applicable to other types of services that include multicast transmission of data delivered over a network having multiple physical channels or even virtual or logical channels.

Bearer Network Architecture—

FIG. 1 illustrates a typical content-based network configuration with which the apparatus and methods of the present invention may be used. The various components of the network 100 include (i) one or more data and application origination points 102; (ii) one or more content sources 103, (iii) one or more application distribution servers 104; (iv) one or more VoD servers 105, and (v) customer premises equipment (CPE) 106. The distribution server(s) 104, VoD servers 105 and CPE(s) 106 are connected via a bearer (e.g., HFC) network 101. A simplified architecture comprising one of each of the aforementioned components 102, 104, 105, 106 is shown in FIG. 1 for ease of illustration, although it will be recognized that comparable architectures with multiple origination points, distribution servers, VoD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VoD-based or "Watch TV" application) to be transferred to an application distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 can be a computer system where such applications can enter the network system. Distribution servers are well known in the networking arts, and accordingly not described further herein.

The VoD server 105 comprises a computer system where on-demand (OD) content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the application distribution server 104) that can be accessed by a distribution server 104.

Figure 1A:
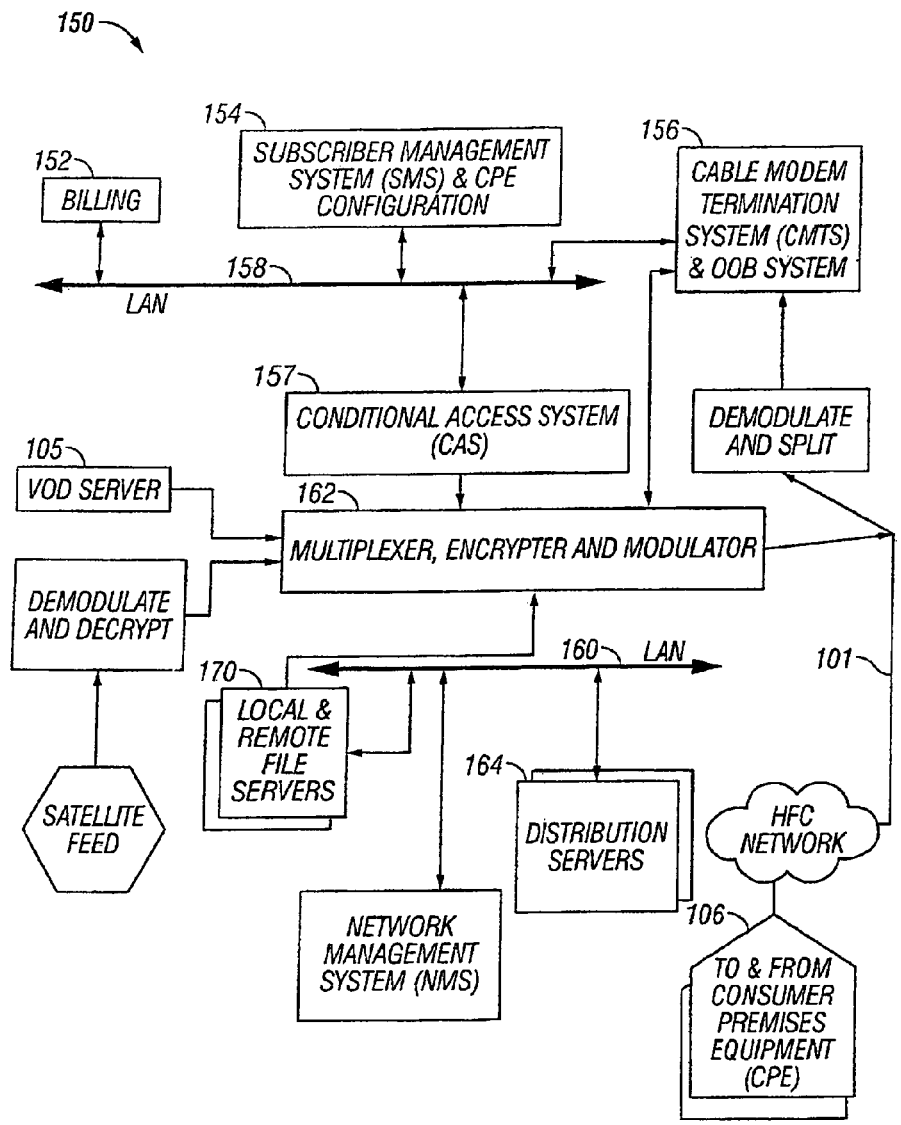
FIG. 1a is a functional block diagram illustrating one exemplary HFC cable network headend configuration useful with the present invention.

Referring now to FIG. 1a, one exemplary embodiment of headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
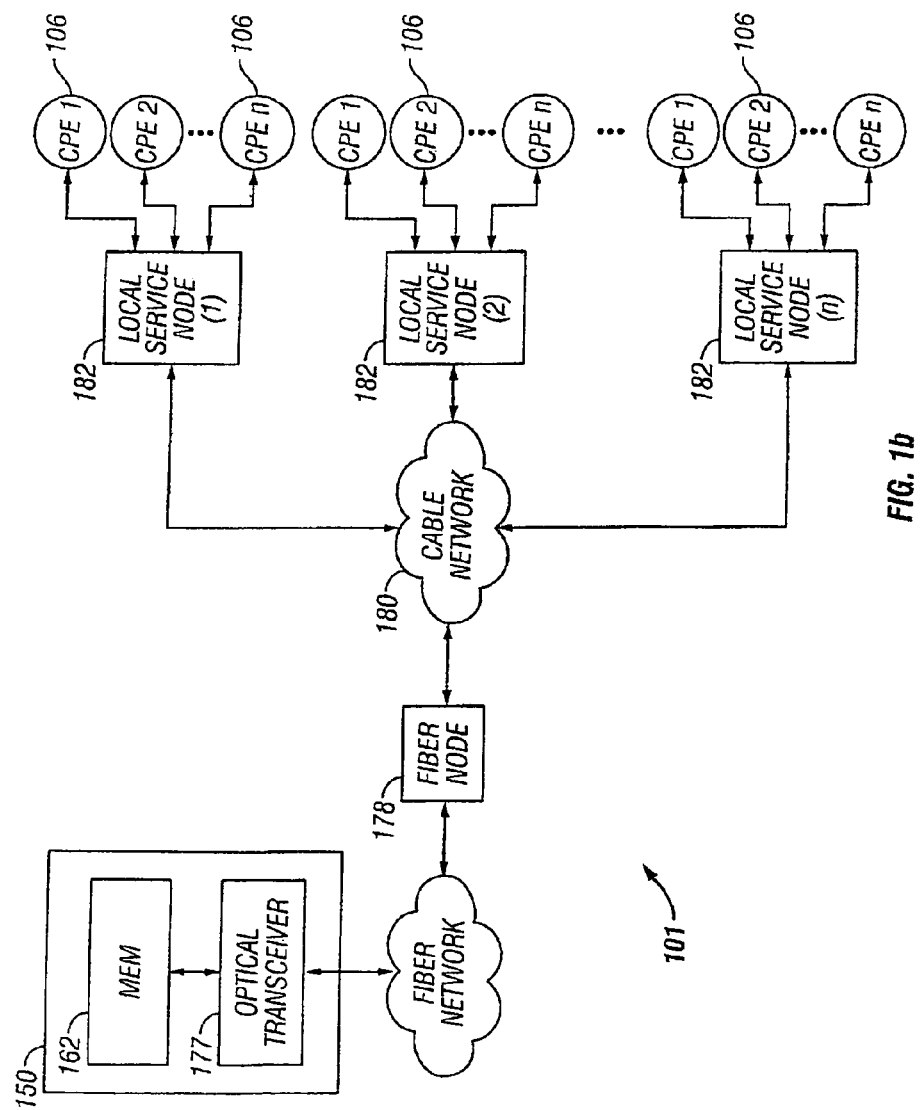
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

Figure 1C:
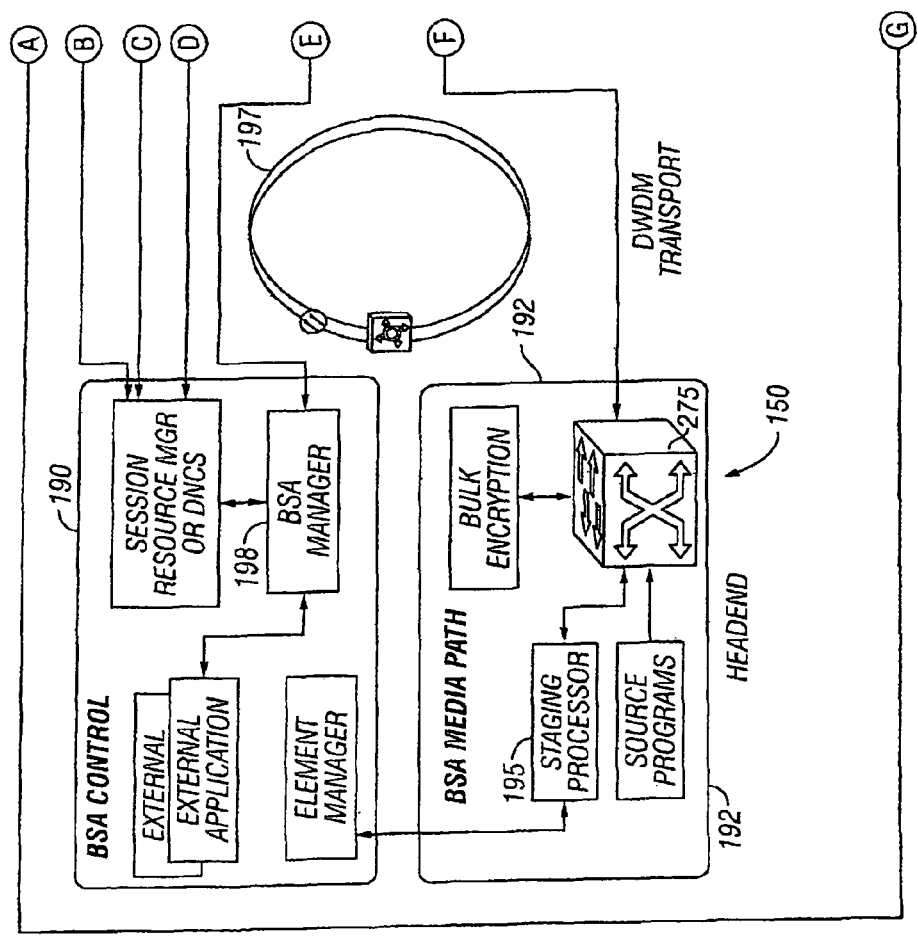
FIG. 1c is a functional block diagram illustrating one exemplary broadcast switched architecture (BSA) network useful with the present invention.
Figure 1C:
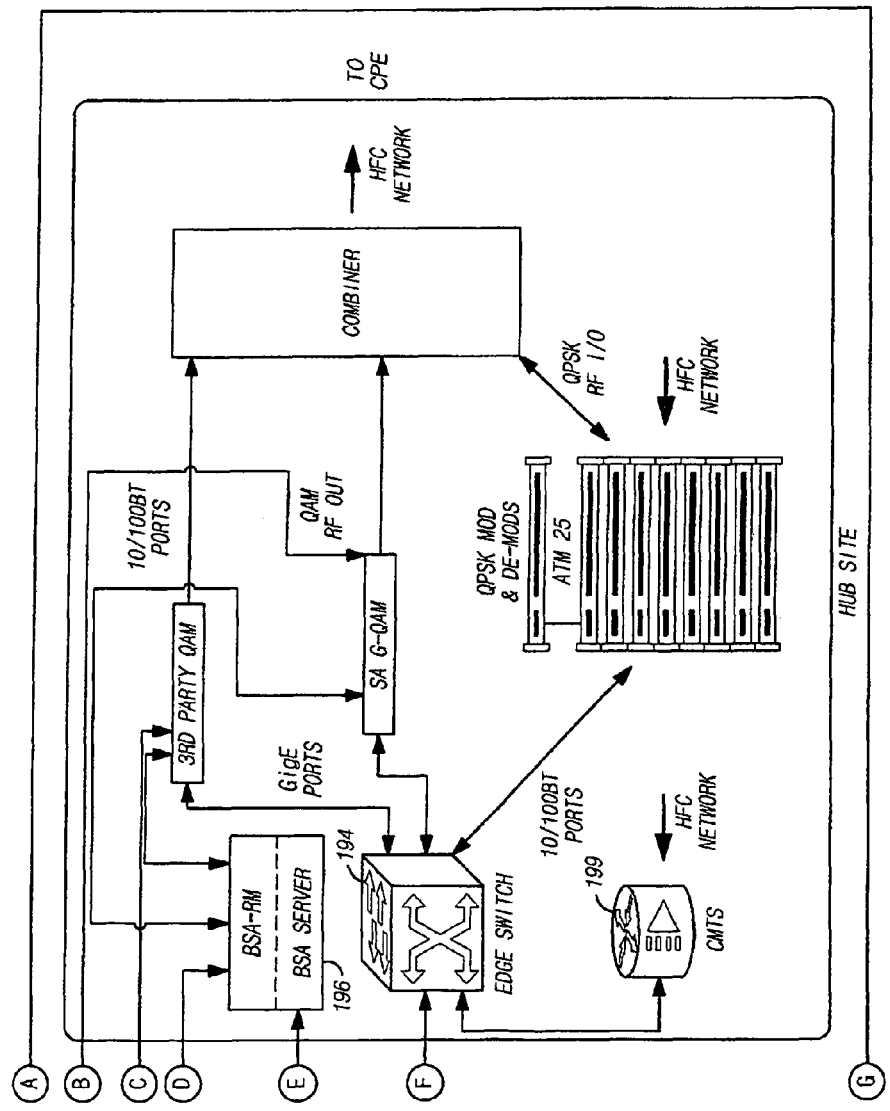

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. patent application Ser. No. 11/048,334, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks

FIG. 1c illustrates exemplary switched network architecture also useful with the present invention. While a so-called "broadcast switched architecture" or BSA network is described as the content delivery mechanism in one embodiment of the invention, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", which is patented as U.S. Pat. No. 8,713,632 on Apr. 29, 2014, and incorporated herein by reference in its entirety, describes one exemplary broadcast switched digital architecture useful with the present invention, although it will be recognized by those of ordinary skill that other approaches and architectures may be substituted.

In order for the BSA function to be transparent to the subscriber, channel change latencies are kept to a minimum (e.g., 250 ms or less as compared to average linear digital broadcast services). Like video-on-demand (VoD) systems, BSA programs are streamed to a service group (contrast: switch) only when being viewed. Unlike VoD, many viewers can view the same stream. Typically, only real-time linear programs are included in BSA broadcasts. Since there is no storage involved, the "VCR" controls (e.g., trick mode functions) common to VoD are not available. In this regard, BSA is much simpler than VoD. Commercials or other programming segments cannot be skipped, and program bitrates can be treated as in more conventional systems.

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bitrates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system typically gathers and keep logs or other records of programmer-specific viewership data. For example, the BSA server gathers logs that are based on the client-server interactions. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VoD overflow.

In one exemplary embodiment, the network session manager (BSA manager) logs all channel change events and is aware of the tuning locations of all tuners, not just those that happen to be viewing BSA programs. This provides highly accurate and complete viewership data based on actual channel changes as contrasted with extrapolations or other estimation techniques.

In the exemplary embodiment of the present invention, the edge switch 194 (generally located in the distribution hub as shown in FIG. 1c) is flooded with all available programs. This improves transport efficiency, because a simple unidirectional "drop and continue" protocol is performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

In addition to "broadcast" content (e.g., video programming), the systems of FIGS. 1a and 1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs; i.e., those with an "internet module" of the type previously described herein) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the RF tuner of the user's STB or other receiver device for viewing on the television, and also as packetized IP data over the DOCSIS QAMs to the user's PC or other IP-enabled device via the user's cable modem. As will be described in greater detail subsequently herein, the exemplary embodiments of the present invention further extend this capability to include delivery of in-band "IP" traffic suitable for viewing via a legacy STB or CPE.

Referring again to FIG. 1c, the IP packets associated with Internet services and destined for the cable modem are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.
Internet Content Delivery There are many internet content media container formats currently in use for internet delivery of video/media files. For example, media files on the internet may be in e.g., 3GP format, AVI format, MPEG format, MP4, QuickTime™ format, RealVideo™ format, Shockwave™ (SWF, FLV) format, Windows™ Media Format, etc.

Further, a variety of codecs may be implemented with relative ease on personal computers, laptop computers and other consumer electronics equipment. In many instances, multiple variants of content encoded using different codecs are made available. Exemplary codecs include, inter cilia, MPEG-1, MPEG-2, H.263, Sorenson Spark, MPEG-4 Part 2, DivX, Xvid, FFmpeg, MPEG-4, 3ivx, MPEG-4 Part 10, x264, VP6, VP6-E, VP6-S, VP7, Sorenson 3, Theora, Windows Media Video (WMV), VC-1, RealVideo, Cinepack, Huffyuv, Lagarith, SheerVideo, and Mobiclip. Although many codecs and container formats are utilized in internet content delivery, perhaps the most common is H.264 for video and AAC for audio. The most common internet content players (including for example those offered by Apple™, Adobe™, Microsoft™, Google™, YouTube™, and Sony™) for Blu-Ray and HD-DVD players support H.264 and AAC encoding.

MP4 is a commonly used file container format for encapsulation of H.264 video and AAC audio contents. MP4 is based and derived from the International Standardization Organization (ISO) Information Technology—Coding of Audio-Visual Objects Part 14: MP4 File Format, ISO/IEC 14496-14:2003 which is herein incorporated by reference in its entirety. The ISO Base Media File Format is based in the concept of box-structured files. Thus, an MP4 media container file format may include a set of boxes which provide binary coded representation of individual audiovisual objects, text, graphics, and synthetic objects, termed "ISO boxes". The interactive behaviors of these objects and the way they are composed in space and time to form an MPEG-4 scene, are dependent on the scene description, which is coded in a binary format known as Binary Format for Scenes (BIFS). The audiovisual streams are defined as Elementary Streams (ESs) and managed according to the Object Descriptor (OD) framework. In addition, the OD framework defines additional streams for object content information.

Figure 2:
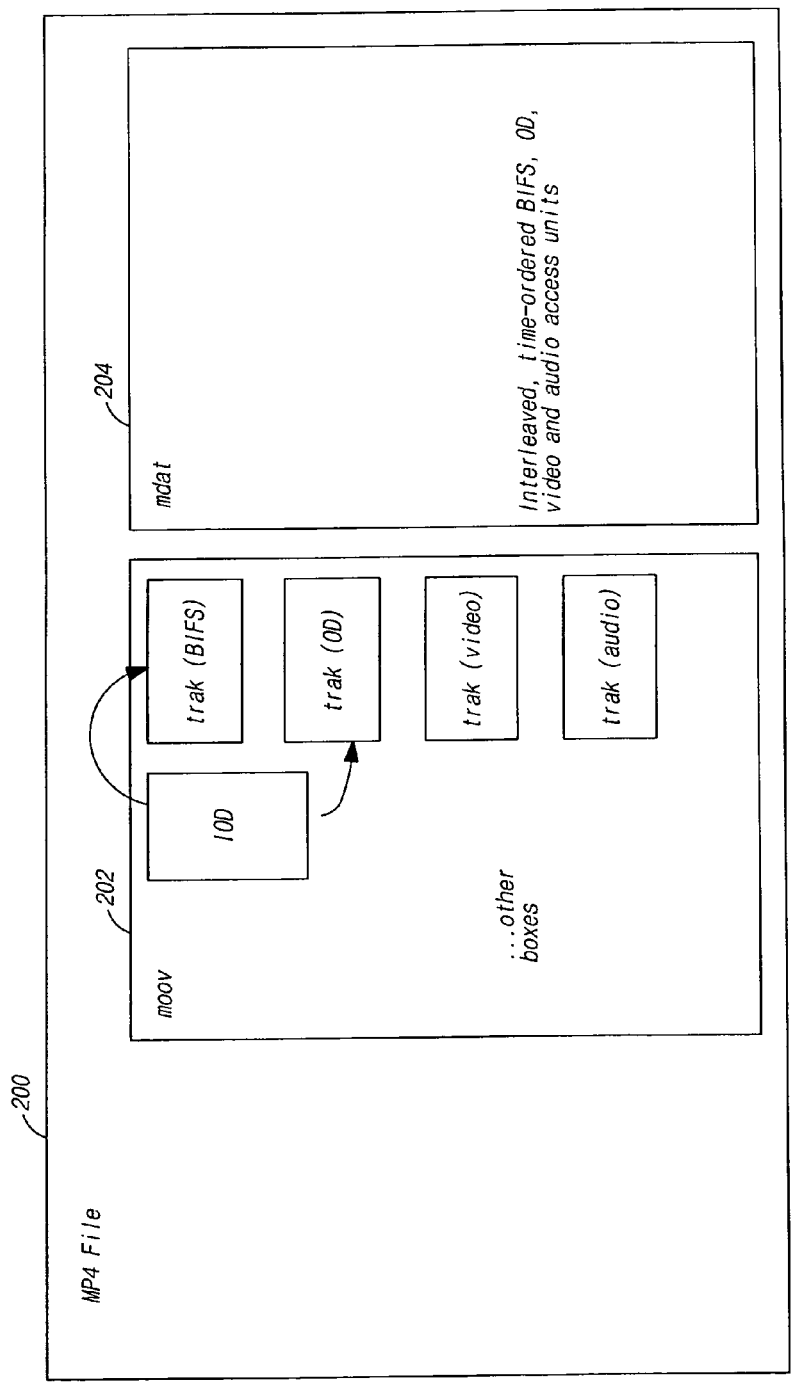
FIG. 2 is a functional block diagram illustrating an exemplary MP4 interchange file structure useful with the present invention.

FIG. 2 illustrates an exemplary MP4 interchange file 200 containing two elementary streams 202, 204. As illustrated, the interchange file 200 is generally self-contained, and does not reference other media files. Further, the interchange file 200, per the ISO standard referenced above, is configured to contain only the media data 204 used in the presentation. The interchange file 200 does not contain any information related to streaming, thereby is considered a small, protocol-independent, self-contained file, which contains the core media data 204 and the information needed to operate thereon. It is appreciated that the present invention may utilize any MP4 standard compliant streams, the interchange file 200 of FIG. 2 being merely illustrative.

Figure 2A:
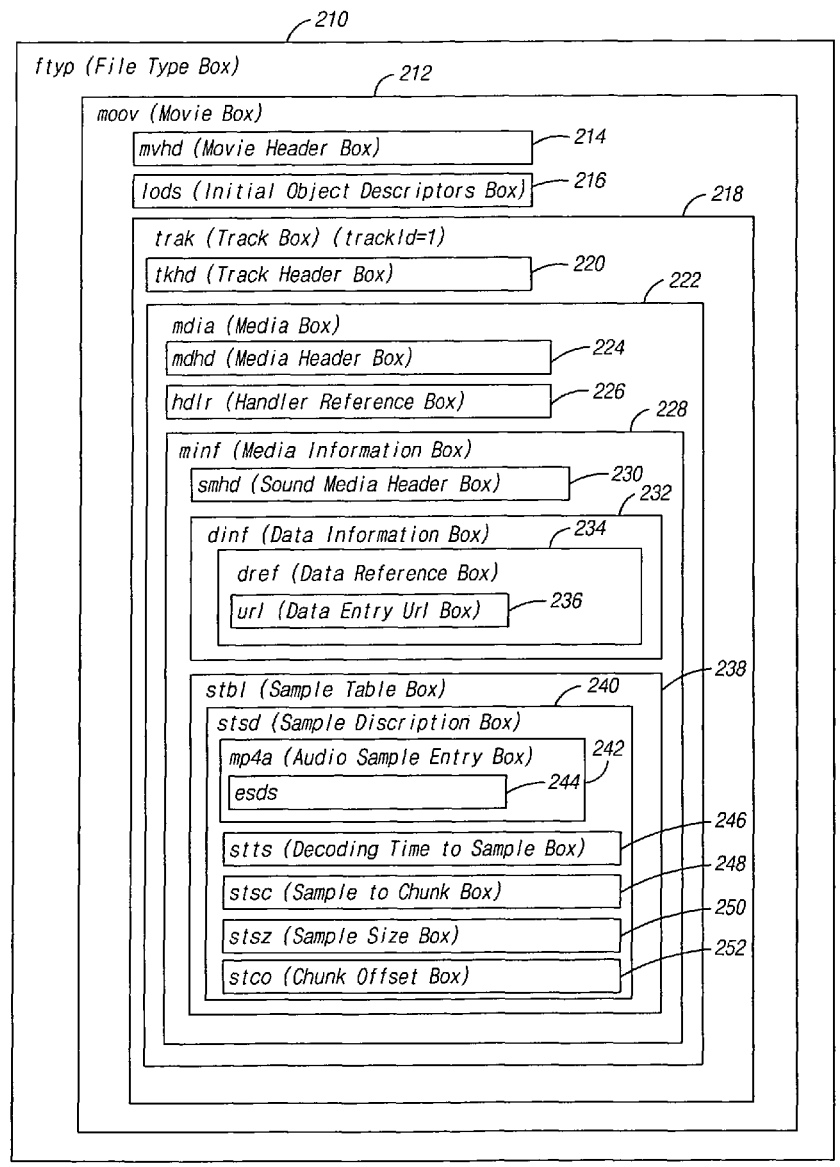
FIG. 2a is a functional block diagram illustrating an exemplary MP4 file structure with ISO boxes useful with the present invention.
Figure 2A:
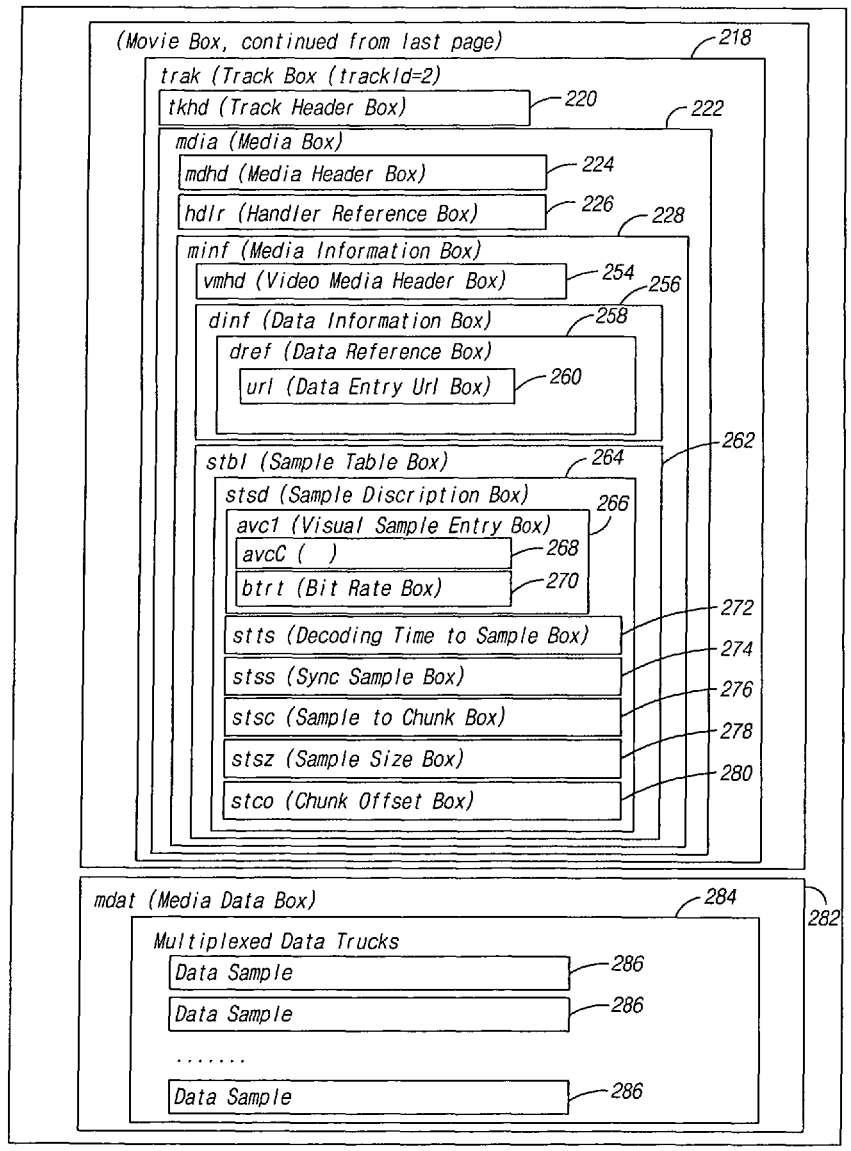

Referring now to FIG. 2a, an exemplary MP4 file structure with ISO boxes is given. As illustrated, the file structure comprises a File Type Box ("ftyp" box) 210. The File Type Box 210 appears in the very beginning of the file, and is used to determine the file type (e.g., MP4, etc.). The file type box 210 further comprises a Movie Box ("moov" box) 212. The Movie Box 212 is a container box for the metadata of a file which occurs at the top-level of a file; it contains a Movie Header Box ("mvhd" box) 214, Initial Object Descriptors Box ("iods" box) 216, Track Boxes ("trak" box) 218, and a Media Data Box ("mdat" box) 282. The mvhd box 214 contains overall information which is media-independent, and relevant to the entire presentation (file). Movie creation time, length, and number of tracks, etc. can be extracted from this box. The Iods box 216 serves as the starting point for the structured format.

Each of the Track Boxes 218 is a container box for a single track of a media stream. The Track Boxes 218 contain Track Header Boxes ("tkhd" box) 220 which specify the characteristics of a track including trackId, creation time, modification time, duration etc., and Media Boxes ("mdia" box) 222 which contain all the objects that declare information about the media data within a track.

Each Media Box 222 contains a Media Header Box ("mdhd" box) 224, a Handler Reference Box ("hdlr" box) 226, a Media Information Box ("minf" box) 228, and a Sample Table Box ("stbl" box) 238. The Handler Reference Box 226 declares the type of the track, for example audio or video track. As will be discussed below, when multiplexing into MPEG-2 transport stream, it is important to distinguish a video or audio track, so correct SI information (e.g., clock and time stamps) can be generated. The Media Information Box 228 contains all the objects that declare characteristic information of the media in the track. The Media Information Box 228 further comprises a Sound Media Header Box ("smhd" box) 230, a Data Information Box ("dinf" box) 232, and a Sample Table Box ("stbl" box) 238. The Sound Media Header Box 230 contains general information, independent of the coding and protocol, for audio tracks.

The Data Information Box 232 contains objects that declare the location of the media information in a track. The Data Information Box 232 includes a Data Reference Box ("dref" box) 234 and Data Entry URL Box ("url" box) 236. The data reference object contains a table of data references (normally URLs) that declare the location(s) of the media data used within the presentation.

The Sample Table Box 238 for the audio data contains all the time and data indexing of the media samples in a track. Using the tables here, it is possible to locate samples in time, determine their type (e.g., I-frame or not), and determine their size, container, and/or offset into that container. The Sample Table Box 238 comprises a Sample Description Box ("stsd" box) 240, a Decoding Time to Sample Box ("stts" box) 246, a Sample to Chunk Box ("stsc" box) 248, a Sample to Size Box ("sttz" box) 250 and a Chunk Offset Box ("stco" box) 252.

The Sample Description Box 240 gives detailed information about the coding type used, and any initialization information needed for that coding. The Sample Description Box 240 may be used to determine video resolution and audio sample rate, audio mode (stereo, mono, etc.). The Sample Description Box 240 further comprises an Audio Sample Entry Box ("mp4a" box) 242 and an Elementary Stream Descriptors Box ("esds" box) 244. The Elementary Stream Descriptors Box 244 is used to specify elementary streamed, priority, language etc.

The Decoding Time to Sample Box 246 contains information to calculate decoding of each sample. As discussed below, is used to calculate DTS when in the PES stream when multiplexed to MPEG-2 transport. Samples within the media data are grouped into chunks. Chunks can be of different sizes, and the samples within a chunk can have different sizes. The Sample To Chunk Box 248 can be used to find the chunk that contains a sample, its position, and the associated sample description. Because in the exemplary embodiment, media data is encapsulated to MP4 file without frame headers as described below, when multiplexing to MPEG-2 Transport Sample To Chunk Box 248 may be used to determine data offset relevant to begin of the file, and extract media data.

The Sample Size Boxes 250 contain the sample count, and a table giving the size in bytes of each sample. This allows the media data itself to be unframed. The total number of samples in the media is always indicated in the sample count. When multiplexing to MPEG-2 transport stream, the Sample Size Boxes 250 are used to determine the number of samples in the data chunks, audio and visual presentation unit boundaries, and size. The Chunk Offset Box 252 specifies the offset of each chunk from the beginning of the file.

The Media Information Box 228 further includes a Video Media Header Box ("vmhd" box) 254. The Video Media Header Box 254 contains general information, independent of the coding and protocol, for visual tracks. As above, the Media Information Box 228 also includes a Data Information Box ("dinf" box) 256, which includes a Data Reference Box ("dref" box) 258 and a Data Entry URL Box ("url" box) 260, and Sample Table Box ("stbl" box) 262.

The Sample Table Box 262 for the video data further includes a Sample Description Box ("stsd" box) 264 which contains a Visual Sample Entry Box ("avc1" box) 266; the avc1 tag in the example of FIG. 2a is used to indicate that the file is conformant with the 'AVC Extensions'. The Sample Description Box 264 also includes an AVC Configuration Box ("avcC" box) 268 which contains AVC Decoder Configuration Record, which describes the video sequence parameter set and picture parameter set, and a Bit Rate Box ("btrt" box) 270 which specifies MPEG4 video elementary stream maximum and average bit rate.

The Sample Description Box 264 further includes a Decoding Time to Sample Box ("stts" box) 272, a Sync Sample Box ("stss" box) 274, which is used to determine random access points within the file, a Sample to Chunk Box ("stsc" box) 276, a Sample Size Box ("stsz" box) 278, and a Chunk Offset Box ("stco" box) 280.

The Media Data Box 282 comprises Multiplexed Data Trucks 284 comprising a plurality of Data Samples 286.

It will be appreciated that additional ISO boxes and/or alternative video and/or audio codecs may be utilized consistent with the present invention, the foregoing being merely illustrative in nature.

Re-Multiplexing and Re-Encoding—

The above described MP4 files are often used as containers to encapsulate H.264 video and AAC audio (although other codecs and encapsulation protocol may be used as well consistent with the invention). Legacy client devices and/or consumer premises equipment (CPE) may not support MP4 file formats. Thus, in order for internet content to be utilized by such client devices/CPE, the audio and video contents must be de-encapsulated and re-encapsulated to MPEG-2 (or other appropriate file format that can be processed by the legacy device).

Figure 3:
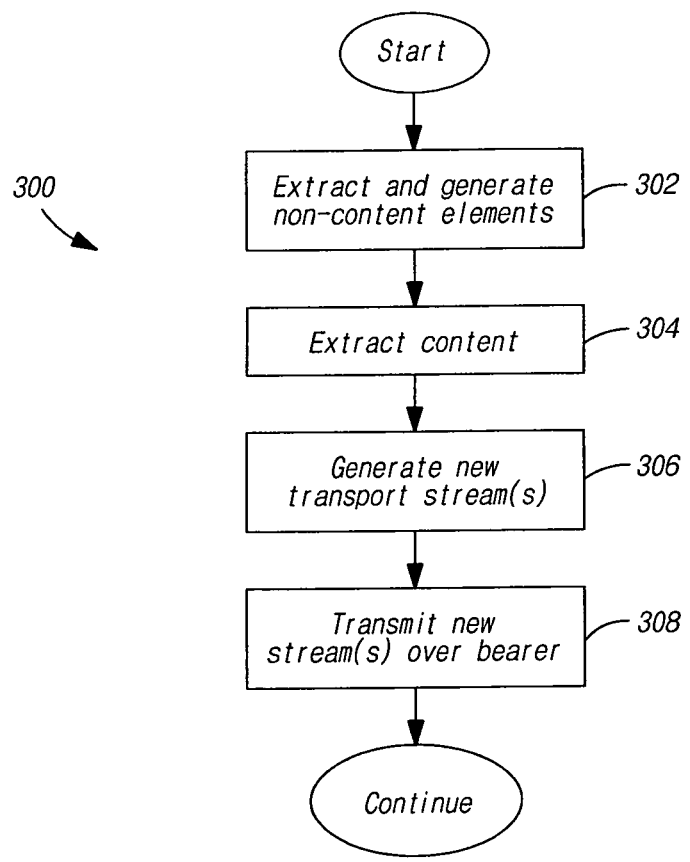
FIG. 3 is a logical flow diagram illustrating one embodiment of the generalized method of processing content according to the invention.

Referring now to FIG. 3, one embodiment of the generalized method of processing content according the invention is described. As shown, per step 302, non-content elements are extracted and/or generated. The non-content elements may include program descriptive information, including headers and timing information.

Next at step 304, content is extracted from the elementary streams. For example, the video/audio content encoded according to the H.264/AAC codecs previously referenced that is encapsulated in a given container or transport is extracted for subsequent repackaging.

The non-content elements and extracted content are then utilized to generate (at step 306) one or more new transports; e.g., MPEG-2 transport streams. Per step 308, the generated transport(s) are transmitted over a bearer network such as an HFC or satellite network for distribution. Advantageously, where the content is extracted and repackaged without de-encoding/re-encoding, the process is completely lossless. In other words, the video encoding the quality of the media stream is retained as is and there is no further degradation.

Figure 3A:
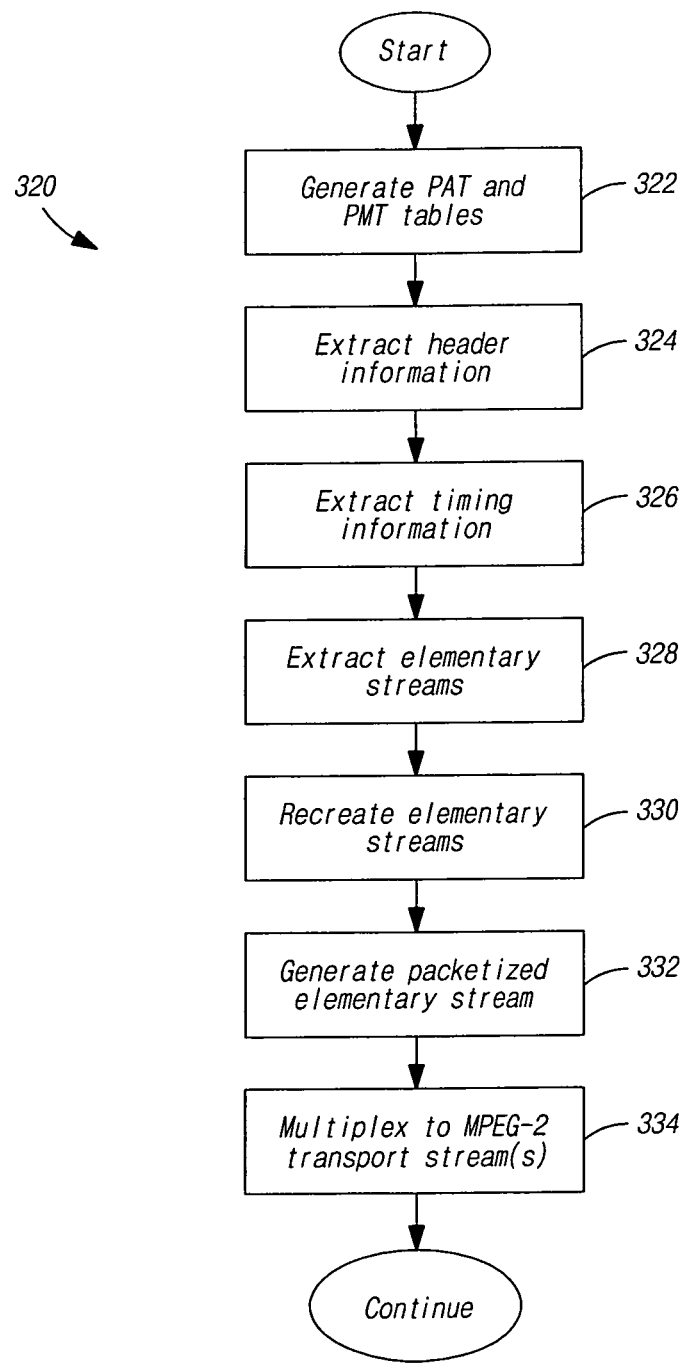
FIG. 3a is a logical flow diagram illustrating one exemplary implementation of the generalized method of FIG. 3.

FIG. 3a is a flow diagram illustrating one specific embodiment of the generalized methodology of de-multiplexing or de-encapsulating content in a first format, and re-multiplexing or re-encapsulating the content into a second format, of FIG. 3. In the illustrated embodiment, the content is received as MP4 files, and re-multiplexed to MPEG-2 files for use on a legacy or similar CPE (i.e., one without native MP4 capability). However, other ingestion and/or output formats may be substituted as well, the following being merely exemplary in nature.

As shown in FIG. 3a, the method 320 comprises first generating a Program Association Table (PAT) and a Program Map Table (PMT) at step 322. A Program Association Table (PAT) is a list of all of the programs available in a transport stream. Each of the listed programs is identified by a program number. The programs listed in PAT also have an associated Packet Identifier (PID) for its Program Map Table (PMT). The PMT contains PIDs of the packets for the elementary streams belonging to the program. As is well known, a packet is the basic unit of data in a MPEG-2 transport stream. In one embodiment, a packet comprises of a sync byte, whose value is 0x47, followed by three one-bit flags and a 13-bit PID. This information is followed by a 4-bit continuity counter. Additional optional transport fields, as signaled in the optional adaptation field, may follow. The rest of the packet comprises the payload (e.g., media content). In one embodiment, the packets are 188 bytes in length.

There is only one PMT in a single program transport stream (SPTS). A PAT has a PID of zero (0). The PAT contains the PID for the PMT, which may be any value (except those reserved by MPEG and other related standards). The PMT contains PIDs of all elementary streams, including video and audio streams; the PMT also contains a stream type for each elementary stream, so that a decoder knows how to decode them.

Next, per step 324, header information is extracted. As discussed above, the exemplary MP4 file uses ISO-based media file format. Thus, in the illustrated embodiment, the MP4 file utilizes ISO boxes containing tags and indicating the size of each box; i.e., "frameless encapsulation". In other words, the headers of the audio and video streams in MP4 format are stripped out when the streams are encapsulated. Audio and video elementary streams in MPEG-2 format, on the other hand, are frame-based. Sync words are the only way to define frame and sequence boundaries in MPEG-2. Therefore, in order to encapsulate the audio and video contents originally in the MP4 into MPEG-2 (as in the exemplary methodology of FIG. 3*a*), header information is added back to the elementary streams. For example, in the illustrated embodiment, for an MP4 format H.264/AAV file, H.264 video sequence and picture headers are included in the avcC box (see FIG. 2*a*). Accordingly, this information is extracted at step 324 for incorporation into an MPEG-2 header.

Per step 326, timing information is extracted from the elementary streams. As illustrated in FIG. 2*a*, the stts box contained in the MP4 file defines the data "delta" decoding time with respect to the last sample. Hence, in one embodiment, the decoding time of each sample is derived from the contents of the stts box at step 326.

At step 328, the elementary streams are separated from one another and extracted. Elementary streams contained in the MP4 file are multiplexed together using boxes. As illustrated in FIG. 2*a*, the stco box specifies the offset of each chunk to the beginning of file, the stsc box specifies number of samples per chunk, and the stsz box specifies the size of samples. According to this embodiment, the elementary streams may be separated and extracted from the MP4 file using information contained in the stco, stsc and stsz boxes.

Figure 3B:
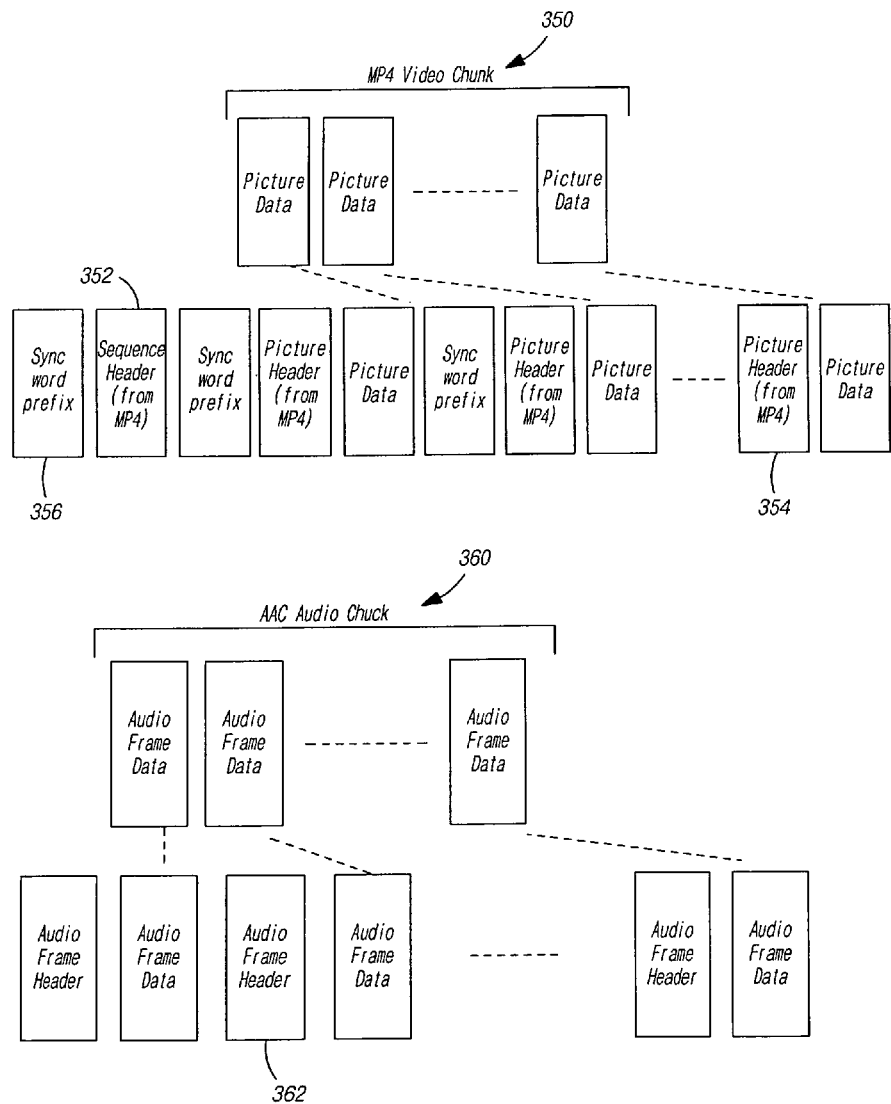
FIG. 3b is a functional block diagram illustrating reconstructed elementary streams for use with the present invention.

At step 330, the extracted elementary streams are recreated. An exemplary recreated elementary stream is given in FIG. 3*b*. As illustrated, the elementary streams included in the MP4 file 350 do not include synchronization (sync) words and proper sequence and picture headers. Thus, recreation of the streams includes adding a sequence header 352 to the beginning of every video chunk, and a picture header 354 to the beginning of every picture. Sync word prefixes (0x00, 0x00, 0x00, 0x01) 356 are also added to beginning of sequence and picture header. However, it will be noted that for AAC audio, the audio frame header 362 including sync word (0xff), sampling frequency, frame size, etc. need to be added to the beginning of each audio frame.

Next, at step 332, a packetized elementary stream (PES) is generated. Decoding/presentation time stamps (DTS/PTS) and program clock reference (PCR) information is also added. In one embodiment, the DTS are derived from the stts boxes of the MP4 file and the PTS derived from the ctts boxes. PCR information is calculated from the number of pictures sent and the picture frame rate. In an alternative embodiment, PCR information may be calculated by number of bytes sent, divided by transport stream bit rate.

Finally, at step 334, the Program Specific Information (PSI) tables, PCR information and PES streams are interleaved and multiplexed to MPEG-2 transport streams according to an MPEG-2 buffer and timing model. In one embodiment the PSI tables comprise PAT (Program Association Tables) and PMT (Program MAP Tables). The elementary streams contained in the MP4 file may have a variable bit rate (VBR); thus, the resulting MPEG-2 transport stream from re-encapsulation of VBR elementary streams is also a VBR stream. In one embodiment, the VBR MPEG-2 transport stream is optionally adjusted to create a constant bitrate (CBR) stream, such as e.g., by multiplexing in null packets or otherwise "stuffing" the stream. However, it will be noted that the addition of the null packets to transport stream (i.e., creation of the CBR stream) requires more bandwidth than the VBR stream due to the added packets.

It will further be appreciated that certain legacy CPE may not have the ability to decode the content in its current codec (for example H.264 and/or AAC content). In these instances, it is necessary to de-code the contents, and subsequently re-encode the contents to a suitable format. Hence, the method of FIG. 3 may optionally include steps for de-encoding and re-encoding the content (aka "transcoding"). In one embodiment, the content may be de-encoded and re-encoded from a first content format to a second content format just prior to the elementary streams being recreated (e.g., step 330 of the method of FIG. 3*a*). However, it is appreciated that this re-encoding may occur at any stage of (including prior or subsequent to) re-multiplexing. It is further appreciated that the content may be de-encoded from literally any of the content formats and re-encoded to any other one of the content formats discussed above. For example, the content may be de-encoded from H.264/AAC format to MPEG-2 format. Since de-encoding and re-encoding content is very CPU intensive and generally results in degradation of the original content quality ("lossy"), it is sometimes not preferable to do so. However, where only a limited number of de-encodings and re-encodings are performed, the relatively minor degradation experienced may be outweighed by other benefits or operational goals such as e.g., enhanced user experience or flexibility in use.

The above described methods are merely exemplary in nature; other implementations will be readily recognized by those of ordinary skill given the present disclosure.

Multiple and Alternate Delivery Paradigms—

It will be recognized that the generalized methodology of FIG. 3 may lend itself to any number of different content delivery paradigms and/or temporal relationships. For example, in one variant of the methodology, the content being delivered comprises linear or broadcast content to be delivered in real time; i.e., the re-multiplexed MPEG-2 (or other format) transport stream is delivered as part of the broadcast stream created at the headend or server hub. In another paradigm, the internet content is broadcast or delivered on-demand, such as in response to an affirmative user selection via e.g., a PC or on-screen user interface. In yet another variant, the internet content stream is delivered to the subscriber and recorded, such as by a digital video recorder (DVR), the content being stored on a local repository (e.g., hard drive or other mass storage device) associated therewith.

The techniques described herein are also directly applicable to nPVR (network PVR) or nDVR delivery paradigms (such as those described in co-owned U.S. Pat. No. 7,457,520 issued Nov. 25, 2008 and entitled "Technique for providing a virtual digital video recorder service through a communications network" incorporated herein by reference in its entirety, as well as so-called "start-over" applications such as those described in co-owned, co-pending U.S. patent application Ser. No. 10/913,064 filed Aug. 6, 2004, published as U.S. Patent Publication No. 2005/0034171 and entitled "Technique for delivering programming content based on a modified network personal video recorder service" incorporated herein by reference in its entirety.

As is well known, nPVR/nDVR functionality provides a user with the ability to control delivery of the content similar to a VoD session, yet for broadcast or live programs. And unlike traditional DVR/PVR approaches, the subscriber need not maintain a recording device within their premises. The MSO or other entity in effect maintains the recorder for the subscriber at the headend or distribution node. Accordingly, in one embodiment of the present invention, "broadcast" or other scheduled internet content could be treated under an nPVR/nDVR paradigm, and recorded and replayed via a network-based device.

"Start-over" technology allows, among other things, a user to restart an in-progress program regardless of whether the user has previously elected to record the program locally. In other words, the "start-over" service obviates the need of a proactive effort otherwise required of a typical DVR user, which includes deciding and actively electing in advance what shows to record. As above, the start-over paradigm is in one variant of the present invention applied to internet content that is delivered via the ICGW (described in detail below) so as to permit a user to "start over" on its delivery, much like any other content.

It is appreciated that for delivery via the DVR, nPVR, nDVR, or start-over delivery paradigms referenced above, the internet content may be stored on a hard disk drive (HDD) or flash memory (e.g., NAND flash) of the storage device, whether located at the customer's premises, headend, network hub, remote server, etc.

Network Architecture for Broadcast of Internet Content—

As noted above, in one embodiment, the internet content may be presented to users as a broadcast. According to this embodiment, certain content may be pre-selected for re-multiplexing and broadcast according to a predetermined schedule.

Figure 4:
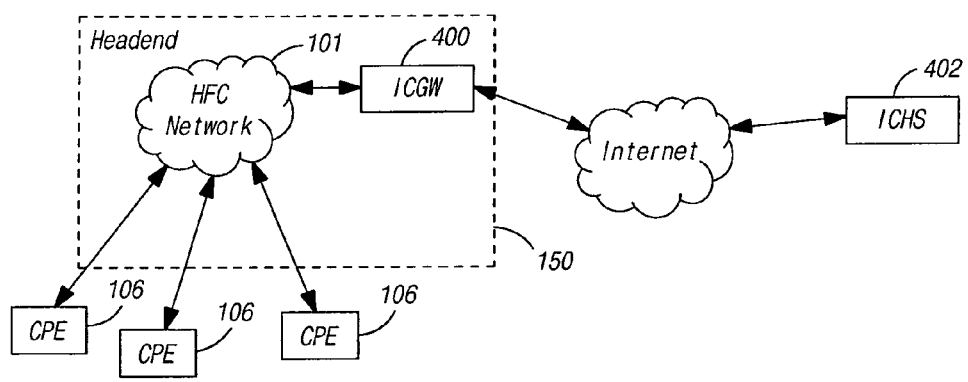
FIG. 4 is a functional block diagram illustrating one exemplary network configuration for broadcast delivery of internet content according to the present invention.

Referring now to FIG. 4, one embodiment of the network architecture specifically implementing the internet content delivery functions (including re-multiplexing) of the present invention is shown and described.

As shown in FIG. 4, the system comprises a cable network headend 150 comprising an HFC network 101 and an internet content gateway apparatus (ICGW) 400 in communication therewith. The ICGW 400 resides that the headend 150 and terminates the internet connection on one side and interface to the MPEG transport on the other side. The ICGW 400 will be discussed in greater detail below. A plurality of CPE 106 are in communication with the HFC network 101 as well. The ICGW 400 is in communication with the HFC distribution network 101 to deliver content and receive data from user equipment (e.g., CPE 106), such as via an out-of-band upstream RF channel, although it will be appreciated that other approaches may be used, including for example delivery via an upstream DOCSIS channel, or even a whole separate transport such as a wireless or wireless IP network (e.g., WLAN, not shown).

One or more internet content host server (ICHS) 402 are also illustrated in FIG. 4, which, via an internet (such as e.g., the Internet), are in communication with the ICGW 400. The ICHS 402 store a plurality of internet data and content which, as will be discussed in greater detail below, is delivered from the ICHS 402 to the ICGW 400. The ICGW 400 then processes the data and content (including re-multiplexing, and packaging the content), and makes the content available to the CPE 106. Although only one ICHS 402 is given, it is appreciated that internet content may be made available from a plurality of host servers.

Figure 4A:
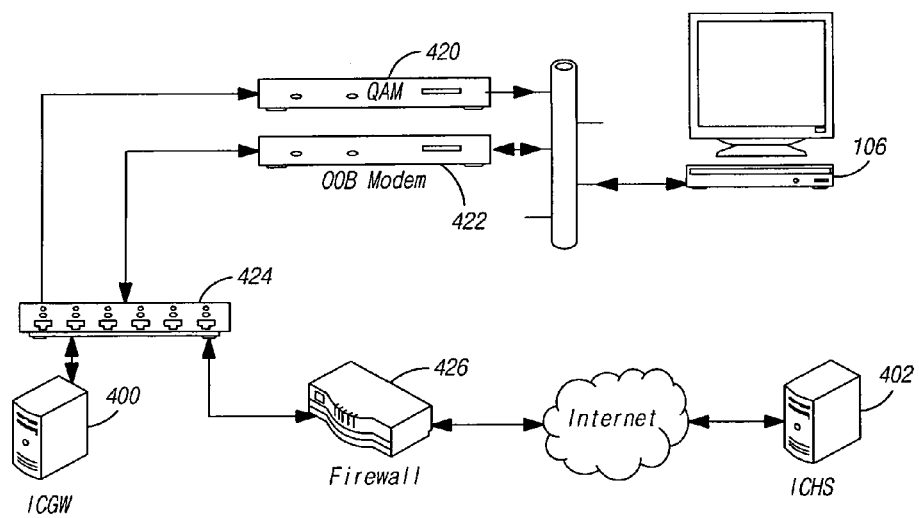
FIG. 4a is a functional block diagram illustrating another exemplary network configuration for broadcast of internet content according to the present invention.

FIG. 4a is one implementation of a network for broadcast of internet content according to the invention. It will be appreciated that the embodiment of FIG. 4a is merely one possible architecture for implementing the system of FIG. 4. Moreover, various subsystems and components shown in FIG. 4 can be combined with others, or functions performed thereby distributed across different functional (e.g., hardware or software) entities already within the content delivery network.

In particular, the embodiment of FIG. 4a illustrates communication (e.g., requests for internet content) from the CPE 106 to the ICGW 400 via an OOB modem 422. FIG. 4a also illustrates the delivery of requested internet content via a QAM modulator 426 over a QAM channel 420. It will be appreciated, however, that communication between the various entities of the present invention may be accomplished via literally any communications mechanism, the aforementioned being merely exemplary in nature.

The embodiment of FIG. 4a further demonstrates the use of an optional firewall 426 designed to block unauthorized access while permitting authorized communications between the headend LAN and internet WAN.

In the embodiments of FIGS. 4 and/or 4a, the illustrated system is disposed substantially at one or more cable or satellite network headends or distribution facilities, however, it will be recognized that this is in no way a requirement, and in fact the components may be distributed among various different physical locations (and connected via network for example) as desired. Moreover, different cable or satellite system headends may share components between them, and/or have multiple ones of components installed for e.g., redundancy/failover protection, different tasking or service, etc.

Methodology for Broadcast of Internet Content—

Figure 5:
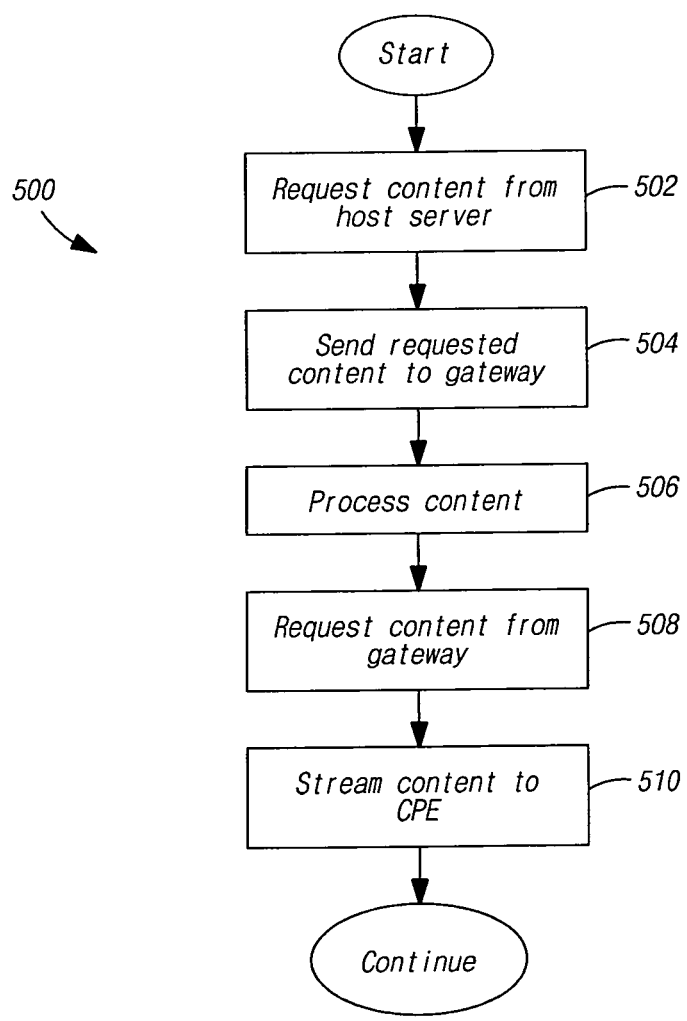
FIG. 5 is a logical flow diagram illustrating an exemplary method of broadcasting internet content according to the present invention.

FIG. 5 illustrates an exemplary method of delivering internet (e.g., Internet) content using pre-setup sessions. The method presented may be utilized in a network configuration similar to those described above with respect to FIGS. 4 and 4a, or others.

Per step 502 of the method, internet content is requested from the host server (e.g., ICHS 402).

Next, at step 504, the requested content is located by the host server and delivered to a gateway device (e.g., ICGW 400). In one embodiment, the request is made by the ICGW 400 of FIGS. 4 and 4a. The ICGW 400 may be configured to make content requests according to a set of rules at prescribed periods. For example, the ICGW 400 may, one or more times a day, week, month, year, etc., request the ICHS 402 deliver the designated content. In another embodiment, the ICGW may request content which has met one or more criteria; e.g., attained a certain level of popularity. In yet another embodiment, the ICGW 400 may request delivery of content which is of a certain genre, type or category, for example, the ICGW 400 may regularly request and receive news content, entertainment-related news content, comedic content, all new video blogs by specified bloggers, all new video content offered by specific sites, advertisement content, etc. from the ICHS 402.

At step 506, the gateway device processes the content so as to de-multiplex the content from a first format and re-multiplex it to a second format. The second format is particularly selected to be compatible with one or more receiving devices (e.g., CPE 106). Accordingly, it is appreciated that selected content may be processed into several different "second" format types for delivery to different receiving devices having different capabilities. In one specific embodiment, the ICGW 400 takes content received in MP4 format, and re-multiplexes it to MPEG-2 content as is disclosed in the exemplary method of FIG. 3. However, other methods for re-encapsulating content may be utilized consistent with the present invention as well.

Figure 11:
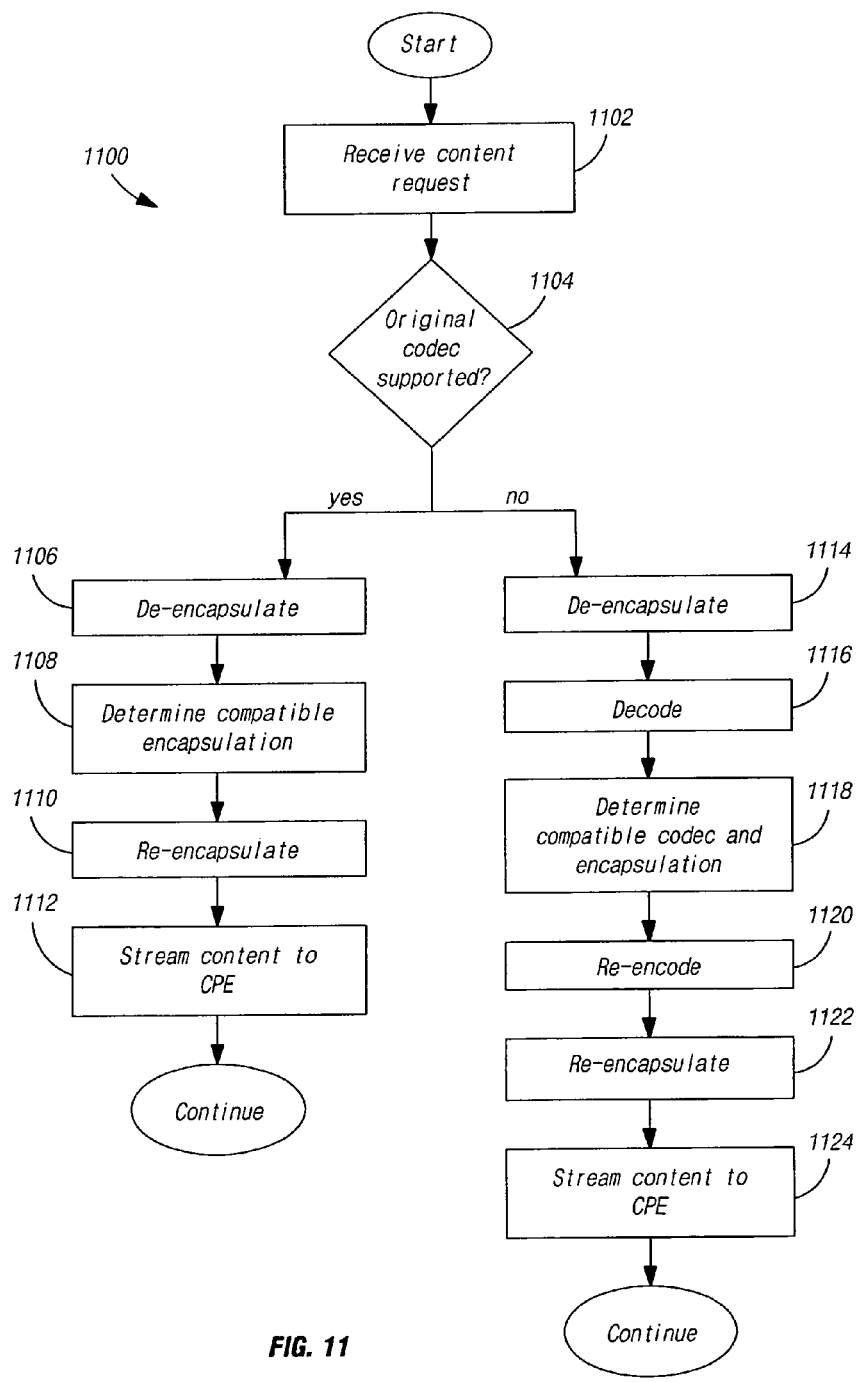
FIG. 11 is a logical flow diagram illustrating one embodiment of a method for selectively determining whether transcoding is required, according to the present invention.

In yet another embodiment, the ICGW 400 may further de-encode the internet content to one or more different codecs. For example, in certain instances receiving devices may not be configured to read content in H.264, hence, the content will, at step 506, be decoded from H.264 and re-encoded into one or more of a plurality of different codecs such as Real, MPEG-2, WMV, etc. See discussion of FIG. 11 provided subsequently herein for one exemplary method of determining whether transcoding is required.

It will be further appreciated that in certain instances, the receiving devices may be capable of receiving content in the encapsulation format transmitted by the ICHS 402. In such a case, re-encapsulating the content may be unnecessary, thus rendering step 506 optional.

The processed content is then assembled and presented to a user for selection. In other words, the processed content is accumulated, and a user is given an option to select, via a CPE 106 or other client device, specific one(s) of the content for delivery (step 508). As indicated above, the content may comprise an established set of content and, may further be made available according to a schedule. For instance, certain internet content, such as a particular vlog, may be made available daily at a prescribed time slot.

It is noted that the accumulation of content in step 508 need not be complete before presentation of the content (or the content listing on a user interface) can occur. In one alternate embodiment, the content is streamed effectively in real time as it is processed, thereby obviating the delay associated with having to process and accumulate all of the content before delivery/playback can occur. This approach may be coupled with specific QoS requirements if desired so as to ensure that breaks in the content do not occur (e.g., pauses in playback while awaiting for arrival of additional packets of the stream).

Lastly, at step 510, the selected content is streamed to the user's CPE 106 for display thereon (e.g., via an associated display device). It will be noted that requests for content may in the embodiment of FIG. 4a be made via an OOB modem to the ICGW 400 and content streamed to the client device via a QAM modulator 424 on one or more QAM channels 420.

The aforementioned systems and methods may be utilized to deliver content to more than one CPE 106 at a time (e.g., simultaneously, such as via broadcast or multicast) without requiring the CPE 106 to establish a dynamic session setup, thereby reducing the network and system load for content delivery and reducing bandwidth requirements.

Network Architecture for VOD Delivery of Internet Content—

As noted above, in another embodiment, internet content may be presented to users using video on-demand (VOD). According to this embodiment, a user may select certain content for re-multiplexing.

Figure 6:
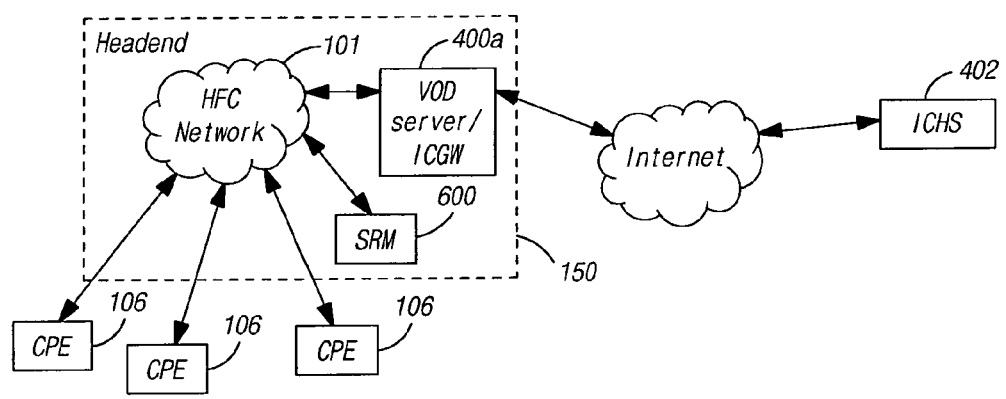
FIG. 6 is a functional block diagram illustrating one exemplary network configuration for on-demand delivery of internet content according to the present invention.

Referring now to FIG. 6, one embodiment of the network architecture specifically implementing the internet content delivery functions (including re-multiplexing) of the present invention is shown and described.

As illustrated in FIG. 6, the system comprises a cable network headend 150 with HFC delivery network 101. An internet content gateway apparatus (ICGW) having VOD server capabilities 400a is in communication with. In many respects, the VOD server/ICGW 400a is similar to the ICGW 400 of FIGS. 4-4a; the VOD server capabilities will be discussed in greater detail below. It is appreciated that, in an alternative embodiment, the VOD server functionality may be disposed on a device separate from yet in communication with a gateway apparatus, such as the ICGW 400 apparatus discussed above.

The headend 150 further comprises a session resource manager (SRM) 600. The SRM manages bandwidth allocation. However, it is appreciated that the VOD server/ICGW 400a may further include SRM functionality. The VOD server/ICGW 400a communicates via the HFC distribution network 101 with a plurality of CPE 106 in order to deliver content and receive data from the CPE 106.

FIG. 6 further illustrates an ICHS (as discussed above with respect to FIG. 4), in communication with the VOD server/ICGW 400a. As noted previously, internet content stored on the ICHS 402 upon request, is delivered to the VOD server/ICGW 400a. Further, it is appreciated that the VOD server/ICGW 400a may be in communication with several ICHS 402 each being associated with different internet content.

In another embodiment, the VOD server/ICGW 400a may utilize "intelligent" caching and de-caching of content within a content-based network using on-demand delivery such as is described in co-owned U.S. patent application Ser. No. 11/904,375 filed on Sep. 26, 2007 and entitled "Method and apparatus for content caching in a video network" and patented as U.S. Pat. No. 8,561,116 on Oct. 15, 2013 (incorporated herein by reference in its entirety). Specifically, the VOD server/ICGW 400a of the present invention may be configured to address the issues described in the aforementioned patent application relating to the trade-off between content storage space and transcoding/transrating/transcrypting efficiencies within the system that occur as a result of trying to support a broad range of end-user device profiles and capabilities. For example, in one embodiment, the OD server/ICGW 400a may include a caching controller which evaluates the demand for certain content elements and formats within the network, and identifies "duplications" of requests (or alternatively, the "proximity" of one request to another in content/encoding/bitrate/encryption space). The caching controller of this embodiment is able to dynamically balance caching of multiple versions of a content element (e.g., movie) and the need for "on the fly" transcoding/transrating/transcryption and associated assets. In another embodiment, the controller may utilize prior knowledge regarding the capabilities of client devices within the network to inter alia provide a speculative or predictive caching capability.

In yet another embodiment, the OD server/ICGW 400a may further de-encode and re-encode the internet content to one or more different codecs. For example, the OD server/ICGW 400a may be configured to decode content from H.264 and re-encode the content into one or more of a plurality of different codecs such as Real, MPEG-2, WMV, etc. This may be utilized, for example, where the receiving device is not configured to read content in the provided codec (e.g., H.264). See discussion of FIG. 11 provided subsequently herein for one exemplary method of determining whether transcoding is required.

Figure 6A:
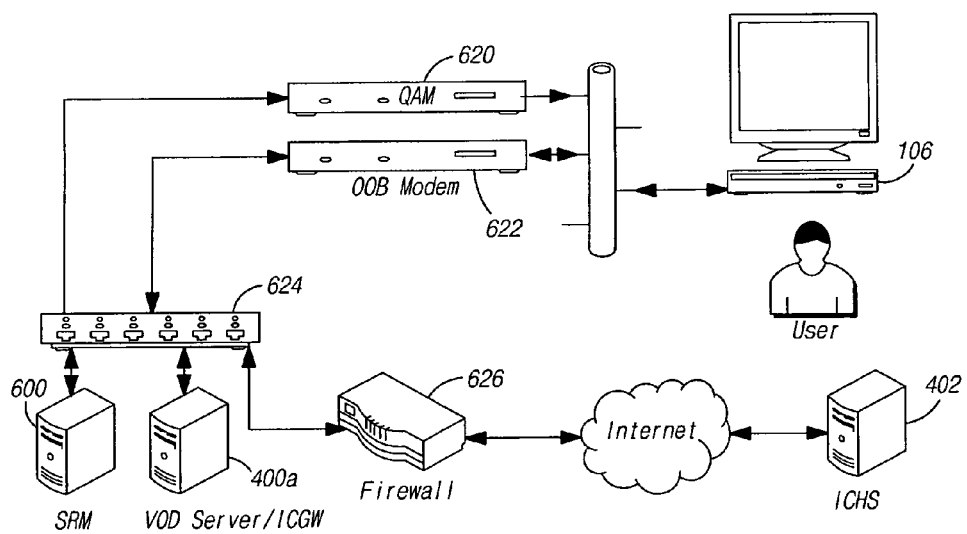
FIG. 6a is a functional block diagram illustrating another exemplary network configuration for on-demand delivery of internet content according to the present invention.

FIG. 6a illustrates one implementation of a network for on-demand delivery of internet content in accordance with the invention. It will be appreciated that the embodiment of FIG. 6a is representative of only one possible architecture for implementing the system of FIG. 6, and should in no way be considered limiting. Furthermore, the various subsystems and components of FIG. 6 can be combined with others, or functions performed thereby distributed across different functional (e.g., hardware or software) entities already within the content delivery network.

Specifically, the embodiment of FIG. 6a illustrates communication (e.g., requests for internet content) from the CPE 106 to the VOD server/ICGW 400a via an OOB modem 622. FIG. 6a also illustrates the delivery of requested internet content via a QAM modulator 626 via a QAM channel 620. It will be appreciated, however, that communication between the various entities of the present invention may be accomplished via literally any communications channels. The embodiment of FIG. 6a further demonstrates the use of an optional firewall 626 designed to block unauthorized access while permitting authorized communications between the headend LAN and internet WAN.

As noted above with respect to FIGS. 4-4a, the embodiments of FIGS. 6-6a, although illustrated as disposed substantially at one or more cable or satellite network headends or distribution facilities, may be distributed among various different physical locations (and connected via network for example) as desired. Different cable or satellite system headends may share components between them, and/or have multiple ones of components installed for e.g., redundancy/failover protection, different tasking or service, etc. as well.

Methodology for On-Demand Delivery of Internet Content—

Figure 7:
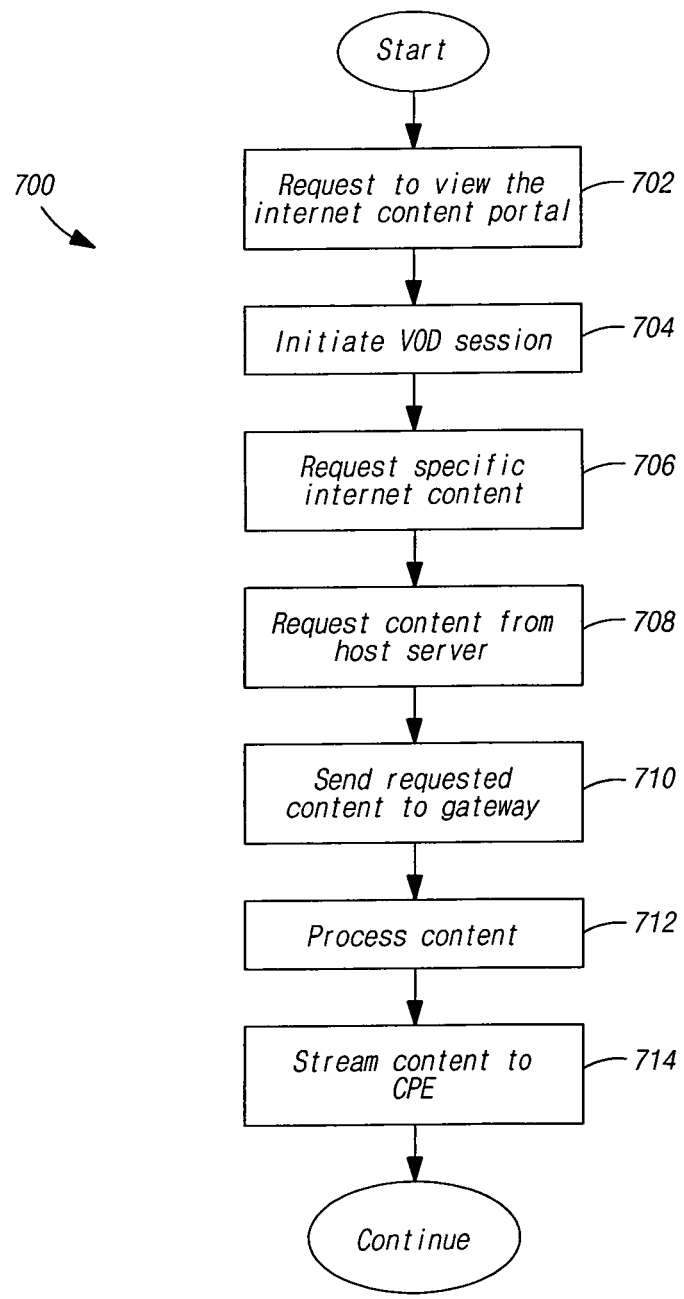
FIG. 7 is a logical flow diagram illustrating an exemplary method of providing internet content on-demand according to the present invention.

There are virtually an unlimited number of internet video content elements; it is impossible to "pre-setup" sessions and broadcast all the content. Hence, providing a user the ability to select internet content and have the content delivered on-demand may be preferable in certain instances (e.g., for content which has not reached the desired level of popularity or other criteria, etc. discussed above). FIG. 7 illustrates an exemplary method of delivering internet content using on-demand sessions. The method presented may be utilized in a network configuration similar to those described above with respect to FIGS. 6 and 6a.

It will be noted that playing a VOD stream typically involves downloading the stream to a video server and adding assets. Since the amount of internet content available is nearly unlimited, it is virtually impossible to download every stream to the video server and setup assets for each. In order to overcome this obstacle, the present invention advantageously establishes a separate portal stream between the client and headend entities. Per step 702 of the method, the CPE 106 requests to view the internet content portal; the request is handled by the SRM 600. In one embodiment, the CPE 106 communicates with the SRM 600 via an OOB modem 622 as illustrated in FIG. 6a.

Next, per step 704, the SRM 600 initiates a VOD session. The initiation of the VOD session enables the internet content portal to be viewed by the user at the CPE 106, the portal stream is played, just as it plays for the normal VOD streams. In one embodiment, the internet content portal comprises an interface with which a user interacts via a client application (discussed below). From the interface, the user may browse available internet content (including pre-processed content as discussed above), and select specific content for viewing. When client application makes request to play internet content streams, it uses proprietary protocol to make a request to an internet content proxy server, e.g., VOD server/ICGW 400a.

Figure 7A:
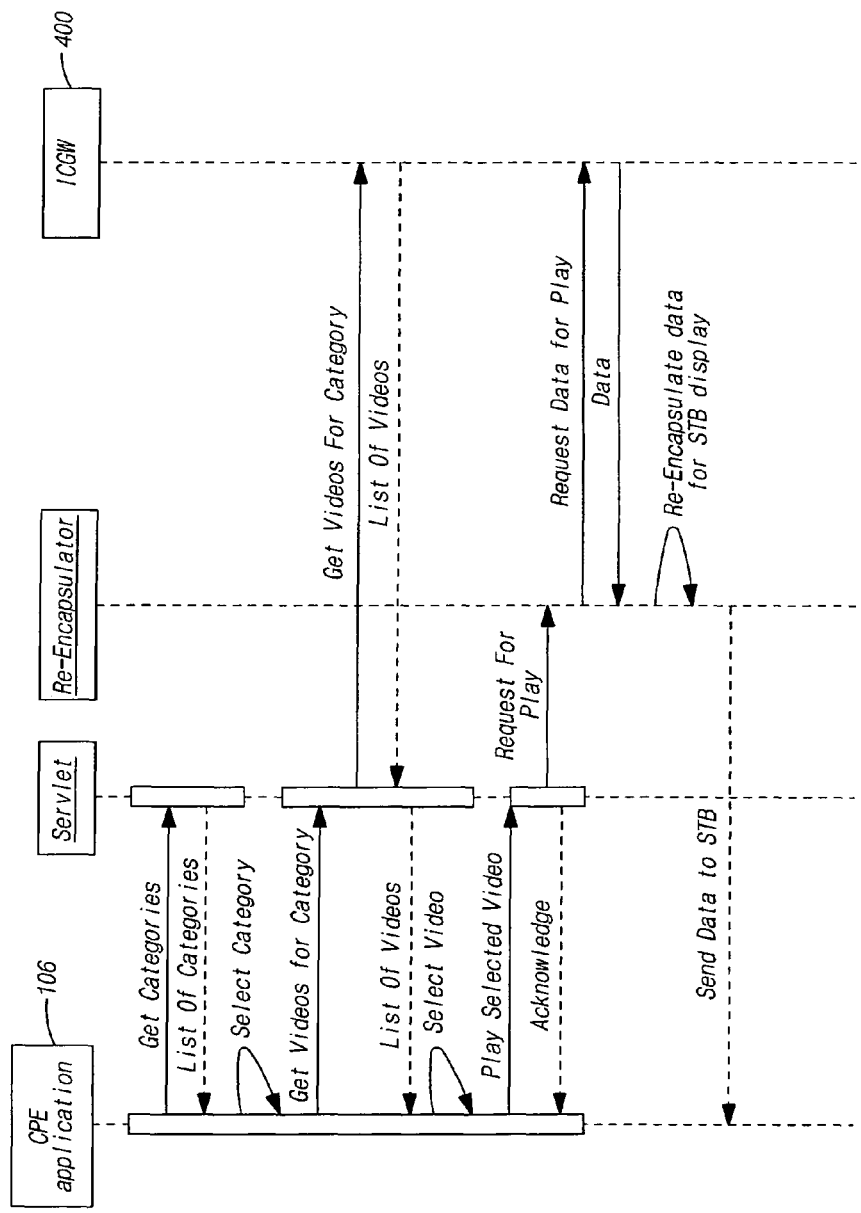
FIG. 7a is a logical flow diagram illustrating a protocol for requesting internet content according to the present invention.

An exemplary protocol for requesting internet content is illustrated in FIG. 7a. The protocol may be MSO specific and may comprise an HTTP based message protocol. In the embodiment of FIG. 7a, an application running on the CPE 106 passes a content selection and the session ID to the ICGW 400a (or VOD server/ICGW 400a).

If the user selects content which has been pre-processed, the method will follow the steps discussed in FIG. 5 above. If however, the user selects content which has not been pre-processed, at step 706, a request for the selected internet content is transmitted to a VOD server and/or gateway device (such as the VOD server/ICGW 400a of FIGS. 6-6a) using the aforementioned proprietary protocol. In the embodiment utilizing the network architecture of FIG. 6a, the request is sent from the CPE 106 to the VOD server/ICGW 400a via an OOB modem 622.

Once the VOD session is established, the session can be reused to play all the internet audiovisual stream, hence no additional session setup required, and no stream copy and asset creation required for internet streams.

Per step 708 of the method, the selected internet content is requested from a host server (e.g., ICHS 402) by the gateway apparatus. In one embodiment, the ICGW 400 or VOD server/ICGW 400a establishes communication with the ICHS 402 and requests content stored thereon or stored at a device associated with the ICHS 402. Next, at step 710, the requested content is located by the host server and delivered to a gateway device.

At step 712, the gateway device processes the content received from the host server. In one embodiment, the VOD server/ICGW 400a de-multiplexes the content from a first format and re-multiplexes it to a second format. Selection of the second format is based in part on the capabilities of the CPE 106 which has requested the content. Still further, the VOD server/ICGW 400a may process the selected content into several different second format types, content having a format type compatible with the requesting CPE 106 being delivered thereto, and content in the other format types being stored for future delivery to different receiving devices having different capabilities. In one specific embodiment, the selected content is received from the ICHS 402 in MP4 format, the VOD server/ICGW 400a then re-multiplexes the content to MPEG-2 transport content such as according to the method disclosed in FIG. 3 above. However, it will be appreciated that other methods for de-encapsulating/re-encapsulating content may be utilized consistent with the present invention as well. In yet another embodiment, the VOD server/ICGW 400a may further be configured to de-encode the internet content and re-encode the content to one or more different codecs (e.g., decode the content from H.264 to one or more other codecs). The processing step (step 712) may be considered optional, such as when the receiving device is capable of receiving content in the encapsulation format transmitted by the ICHS 402.

The processed content is then assembled and streamed to the user CPE 106 (step 714). The user CPE 106 may then display the internet content thereon or on a display device associated therewith. In an embodiment utilizing the network architecture of FIG. 6a, the internet content is streamed to the client device via a QAM modulator 624 on one or more QAM channels 620.

In one embodiment, the apparatus and methods for downloading data (such as large binary objects or files) at accelerated rates over a communication channel within a network as described in co-owned U.S. patent application Ser. No. 11/013,665 filed on Dec. 15, 2004 and entitled "Method and apparatus for high bandwidth data transmission in content-based networks", which is patented as U.S. Pat. No. 8,522,293 on Aug. 27, 2013, and incorporated herein by reference in its entirety, may be utilized in conjunction with the present invention. As discussed therein, in one embodiment, the network comprises a cable television network, and data delivery is accomplished via a "point-to-point" approach wherein a session is established between the receiving entity (such as a CPE 106) and the distributing entity (e.g., a VOD server/ICGW 400a) using one or more allocated QAMs, and a program identifier. Session establishment and data flow control are advantageously implemented using protocols and bandwidth that are typically used for delivery and control of video-on-demand (VOD) or similar services, thereby obviating any substantive modifications to the existing network infrastructure. Sessions can be established for the data transfer, and then immediately terminated when the transfer is completed, thereby rapidly freeing up bandwidth on the network as with a conventional OD session. The data download methods of the invention are also completely agnostic to the type of payload data being transmitted, thereby allowing the transfer of literally any type of data or files over the network.

Using the method 700 described herein, submission of a request for an internet content involves only the client application and the proxy server (e.g., the VOD server/ICGW 400*a*), but not the SRM. Further, as indicated above, a single VOD session can be reused for subsequent request for new content elements until the session is terminated by the client application. The proxy server ensures that the same session parameters (IP address, port, program number, PIDs etc) are used so that switching between new and old internet content streams is transparent to other parts of the system, and so that the previously setup session may be reused.

The processed content may also, in another embodiment, be stored for future requests by other (or the same) CPE 106 at e.g., a headend entity in communication with the VOD server/ICGW 400*a*. According to this variant, the VOD server/ICGW 400*a* may, prior to requesting content from a host server 402, first search the headend storage entity for a pre-processed version of the content for delivery to the requesting CPE 106.

Internet Content Gateway Device—

Figure 8:
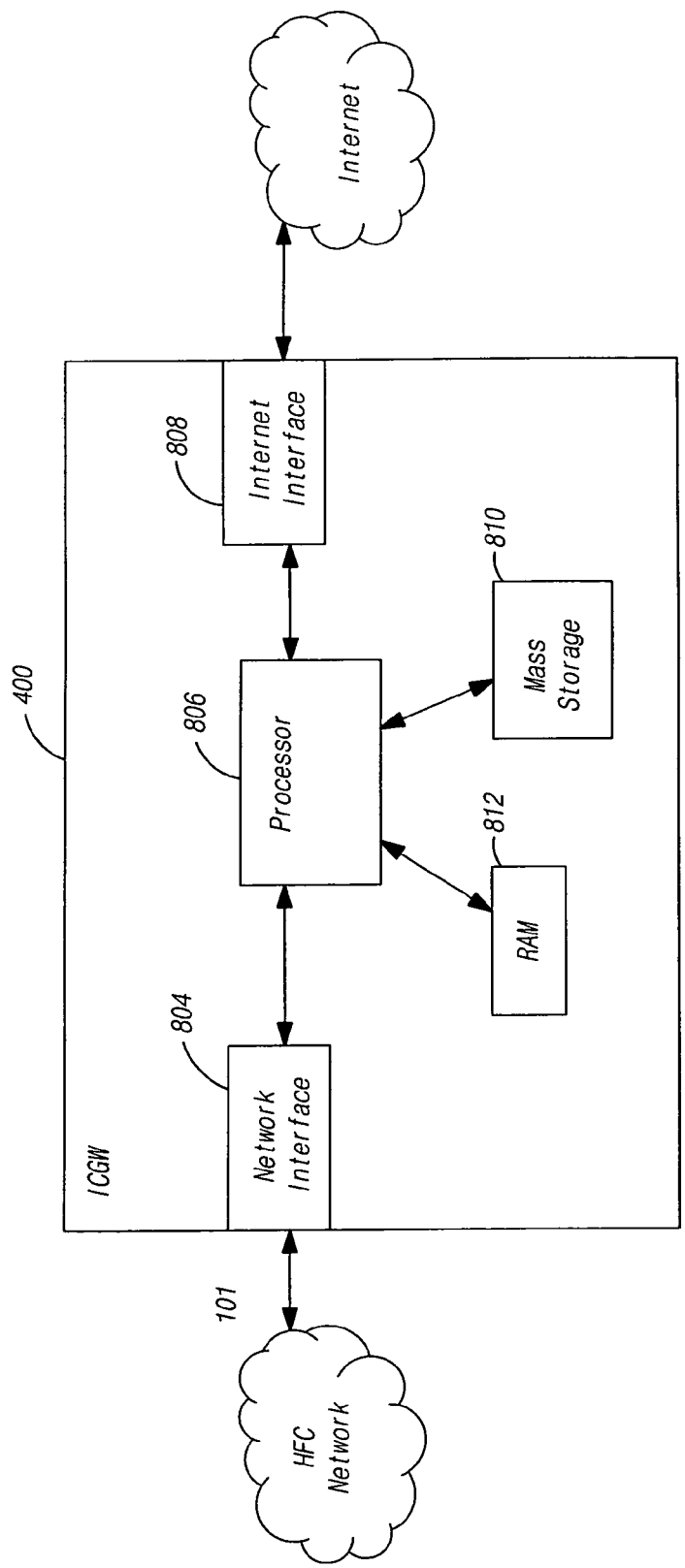
FIG. 8 is a functional block diagram illustrating an exemplary internet content gateway device for use with the present invention.

An exemplary implementation of the ICGW 400 is illustrated in FIG. 8. The ICGW 400 generally comprises an OpenCable-compliant network server or controller module adapted for use at the headend or hub site(s) of FIGS. 1-1*c*, although the server may comprise other types of devices (e.g., VoD or application servers, SRM or other supervisory processes, etc.) within the network as previously described.

The ICGW 400 comprises a digital processor(s) 806 and associated RAM 812, a storage device 810, a network interface 804 for interfacing with the HFC network 101, and an internet interface 808 capable of interfacing with other devices via an internet. It is noted that the network interface 804 may comprise a plurality of interfaces for use with other network apparatus such as RE combiners, IP routers and other packet network devices, network management and provisioning systems, local PCs, etc. The interface may be e.g., an IEEE-1394 interface, a USB interface, a LAN interface, an ASI/GBE interface, etc. Other components which may be utilized within the ICGW 400 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data and "rules" interchange between the ICGW 400 and the CPE 106.

The processor 406 is configured to run at least software which when executed, performs the de-multiplexing/re-multiplexing process described above. The software running thereon may be further configured to perform the de-encoding/re-encoding process indicated above as well. One or more applications running on the processor 406 enable the ICGW 400 to communicate with the ICHS 402 and client devices 106. The processor 406 (via one or more computer programs running thereon) may also be configured to provide a functional interface with client processes on the network CPE 106 (where used), or other interposed or remote entities, such as via configuration of its software stack to include the necessary communication protocols and modules to communicate with the CPE and/or remote entities. These components and functionalities are well known to those of ordinary skill in the cable and embedded system fields, and accordingly not described further herein.

The ICGW 400 of FIGS. 4 and 4*a* may take any number of physical forms, comprising for example one of a plurality of discrete modules or cards within a larger network headend, edge or hub device of the type well known in the art. The server may also comprise firmware, either alone or in combination with other hardware/software components such as those previously described. Alternatively, the ICGW 400 may be a stand-alone device or module disposed at the headend, hub or other site, and may even include its own RF front end (e.g., modulators, encryptors, etc.) or optical interface so as to interface directly with various portions of the HFC network 101. Numerous other configurations may be used. The ICGW 400 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the aforementioned de-multiplexing/re-multiplexing and/or de-encoding/re-encoding functionality described above may take the form of one or more computer programs (e.g., network and client processes). Alternatively, such computer programs may have one or more components distributed across various hardware environments at the same or different locations, such as where a network process is distributed across multiple platforms at the hub site and the headend 150.

As yet another example, portions of the functionality may be rendered as a dedicated or application specific IC having code running thereon. Myriad different configurations for practicing the invention will be recognized by those of ordinary skill in the network arts provided the present disclosure.

CPE—

Figure 9:
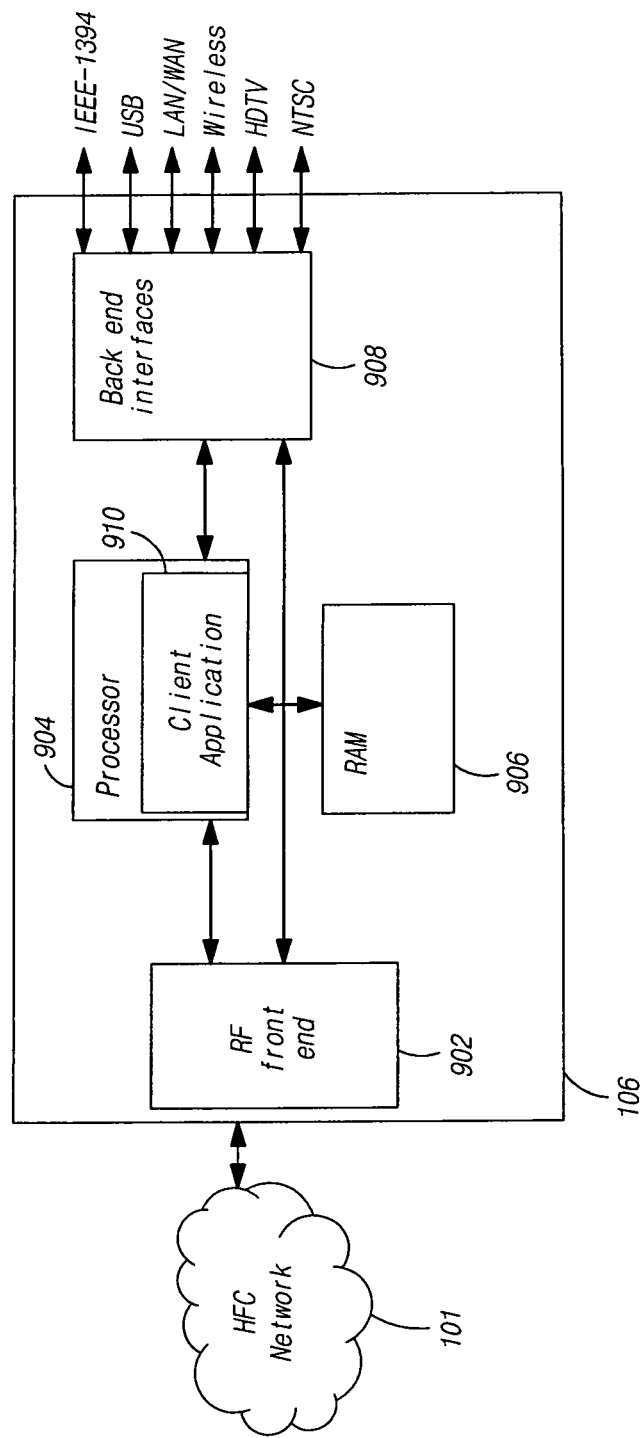
FIG. 9 is a functional block diagram illustrating an exemplary consumer premises equipment for use with the present invention.

FIG. 9 illustrates an exemplary embodiment of the improved CPE 106 according to the present invention. As shown in the simplified diagram of FIG. 9, the device 106 generally comprises and OpenCable (OCAP)-compliant embedded system having an RF front end 902 (including tuner and demodulator/decryptors) for interface with the HFC network 101 of FIGS. 1-1*c*, digital processor(s) 904, storage device 906, and a plurality of interfaces 908 (e.g., video/audio interfaces, IEEE-1394 "FireWire", USB, serial/parallel ports, etc.) for interface with other end-user apparatus such as televisions, personal electronics, computers, Wi-Fi or other network hubs/routers, etc. Other components which may be utilized within the device (deleted from FIG. 9 for simplicity) include various processing layers (e.g., DOCSIS MAC or DAVIC OOB channel, MPEG, etc.), as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 9 is also provided with an OCAP 1.0-compliant application and Java-based middleware which, inter alia, manages the operation of the device and applications running thereon. It will be recognized by those of ordinary skill that myriad different device and software architectures may be used consistent with the functions of the present invention, the device of FIG. 9 being merely exemplary. For example, different middleware (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc.

In the illustrated embodiment, the digital processor 904 is adapted to run at least one client application 910. The client application 910 enables a user to request to view the internet content portal (thereby enabling the SRM 600 to establish a VOD session). The client application 910 may further be adapted to facilitate searching/browsing internet content as well as transmission of a request for selected internet content to the VOD server/ICGW 400*a*. In another embodiment, the client application 910 is further utilized in streaming the requested internet content to the user for viewing on the CPE 106 or an associated display device. As noted above, a single VOD session may be used to provide second internet content after delivery of first internet content has been completed. In other words, once selected internet content has been displayed, the CPE 106 VOD session remains "open" and a user may, via the client application 910, continue searching/browsing for additional internet content. The second internet content is sent to the user in much the same manner as discussed above.

In another embodiment, elements in both the head-end and CPE 106 are specially adapted to utilize existing transmission infrastructure to transmit and receive both multiplexed wideband content and legacy content as is described in co-owned, co-pending U.S. patent application Ser. No. 11/013,671 filed on Dec. 15, 2004 and entitled "Method and apparatus for wideband distribution of content", which is incorporated by referenced herein in its entirety. As discussed, the CPE 106 of this embodiment may be configured to contain multiple tuners (or a single wide-band tuner) which allow the CPE 106 to receive the signals from all of the relevant physical carriers simultaneously. The carriers are demodulated, and channel-based decryption and basic demultiplexing (recombination) is performed. The streams are then delivered to a transport demultiplexer which demultiplexes all of the streams resident within the statistical multiplex. At the head-end, transport stream processing comprises statistical multiplexing of content obtained via a plurality of input streams into one or more common "multiplexes" (Multi-program transport streams, or MPTS). These multiplexes are then split or divided across multiple different physical carriers for transmission across the network (including modulation, encryption, and RF upconversion). System information (SI) tables are also created at the head-end for inclusion within the transmitted signals. Any packet ID (PID) re-mapping performed by the modulators is optionally made consistent across the entire statistical multiplex pool.

In yet another embodiment, the CPE 106 comprises a converged premises device, such as for example that described in co-owned U.S. patent application Ser. No. 11/378,129 filed Mar. 16, 2006 and entitled "METHODS AND APPARATUS FOR CENTRALIZED CONTENT AND DATA DELIVERY", which is patented as U.S. Pat. No. 8,347,341 on Jan. 1, 2013, and incorporated herein by reference in its entirety. Still further, the CPE 106 may comprise a media bridge as is discussed in co-owned, co-pending U.S. patent application Ser. No. 12/480,597 filed on Jun. 8, 2009 and entitled "Media Bridge Apparatus and Methods", incorporated herein by reference in its entirety.

Tracking VOD Requests for Internet Content—

As noted above, in one embodiment, internet content is selected for by a user for VOD or unicast delivery.

In a further variant, a particular user's VOD requests for internet content may be utilized to provide additional content to the user, and/or anticipate future user requests. For example, a record may be created for each instance of requested content, or a single record modified with each request. The record contains information and metadata describing the user (such as by CPE), the content, any actions taken with respect to the content (such as play, fast-forward, rewind, pause, etc.).

The recorded information may then be collected at a headend entity and processed. For example, metadata contained in the record(s) regarding the genre or type of internet content selected by the user with a given frequency (or most frequently) may be utilized to suggest or recommend other internet content of the same genre or type. "Intelligent" playlist generation (such as that utilized by the exemplary recommendation engine set forth in co-owned and co-pending U.S. patent application Ser. No. 12/414,576 filed on Mar. 30, 2009 and entitled "Recommendation Engine Apparatus and Methods", incorporated herein by reference in its entirety), may be used consistent with the invention.

Similarly, metadata may be used to identify patterns of behavior at the CPE. For example, the records may indicate that over a certain period (e.g., one month) on a daily basis, the user requests a particular vlog. This pattern of behavior may be used to anticipate that the user will request that vlog on subsequent days. Accordingly, the CPE may be "trained" to automatically request the vlog, such as during off-peak hours, and store the content at the user's CPE, DVR, PC, or at a network entity (such as is utilized in the nPVR delivery paradigm discussed above).

Generally speaking, "metadata" of the type referenced above comprises extra data not typically found in the content (or at least not visible to the users of the network). In one embodiment, for each component of the content (e.g., video/audio stream), one or more metadata files are included that specify the relevant search terms or primitives for that content. This metadata can be provided with the content from its source or provider (e.g., ICHS 202), or alternatively added by the network operator or MSO (at e.g., the ICGW 200). Alternatively, portions of the metadata can be added by multiple entities, and/or editing of another entity's metadata performed. Various permutations and mechanisms for generating, adding and editing metadata will be recognized by those of ordinary skill, and hence are not described in greater detail herein.

The metadata information of the exemplary embodiment is packaged in a prescribed format such as XML, and associated with the content to be delivered. In one embodiment, a metadata file resides at the location of each requested content element, such as on a subscriber's DVR within a related directory. Alternatively, the metadata may located at a different place, such as a network server or storage device.

The naming convention of the exemplary metadata file is optionally standardized so that it is easily locatable. All of the metadata files are rendered in the same format type (e.g., XML) for consistency, although heterogeneous file types may be used if desired. If metadata files are encrypted, then encryption algorithm information of the type well known in the art is included. The foregoing information may be in the form of self-contained data that is directly accessible from the file, or alternatively links or pointers to other sources where this information may be obtained.

The recorded information may also comprise records of a user's impression of content, such as by recording an answer to a query of the user after playback of the content has completed or stopped. An interactive client application may be utilized to record these impressions.

Similarly, information regarding a given subscriber's preferences for what they want to see is valuable data for the MSO. By logging all of the subscriber's inputs, and also logging all tuning (channel change) events, power up/down events, VoD session requests and trick mode commands, etc., the MSO can much more accurately determine a given subscriber's preferences and actual impressions of certain content. The MSO in effect know much more definitively what a specific user's preferences/interests are, rather than passive approach where MSO attempts to divine what the subscriber's interests are based on evaluation of their tuning habits, demographic information (e.g., age, income, etc.) alone. Recommendation of addition content may then be facilitated.

It is further appreciated that, in another embodiment, information may be gathered regarding user requests for VOD delivered internet content from a plurality of CPE. In other words, the aforementioned records may be processed, and patterns may be identified across a population of CPE. These patterns may then be used to recommend content for broadcast delivery. For example, suppose the recorded information is processed and it is determined that a threshold number of CPE consistently request the same internet content (such as e.g., the top five most popular YouTube™ videos). It may then be apparent that broadcast delivery of the top five most popular YouTube videos would be more efficient than continuing VOD delivery to the CPE individually.

In yet another embodiment, a user may establish a profile which is uniquely tailored to the user. The user may, via a user interface, enter a user name or other identifier (such as an image, a password, etc.) to identify his/her user profile. However it will be appreciated that the user can be anonymously identified if desired via their CPE; see the discussion presented subsequently herein regarding preserving subscriber anonymity. As the viewer begins browsing and requesting internet content (including browsing content presented according to a broadcast schedule), the user selects his/her user name (or other identifier) from a list of previously saved user profiles. The user may also edit his/her user preferences, such as by entering particular genre of internet content the user is interested in, as well as any favorites (such as a favorite vlog, etc.). The user may also enter other information including, inter alfa, gender, age, zip code, occupation, household income, marital status, hobbies, recent large purchases, etc. Upon selection of the user's profile from a list of previously saved profile, the user profile is loaded and any subsequent tuning events and activities are recorded as being associated with the selected user. The profile information may then be used, as discussed above, to recommend internet content and/or predict the future viewing habits of the user.

Subscriber Anonymity—

It will be recognized that various aspects of the present invention are best implemented by having user/CPE-specific data. To the degree that the aforementioned processes utilize subscriber-specific or CPE-specific data in its operation (such as for receiving subscriber preference data for playlists, gathering historical tuning or other operational data, CPE capabilities, VoD session commands, etc.), such data can optionally be protected so as to maintain subscriber privacy. For example, the MSO might use a mechanism to anonymously identify and associate the aforementioned data with particular CPE (and hence individual subscriber accounts). In one embodiment, subscriber identities are optionally protected by hashing or encryption of the tuner address or the like prior to logging and storage. The stored "hashed" address or other parameter (e.g., TUNER ID) and associated events are therefore not traceable to a particular user account. The resulting obscured tuner address is repeatable so the necessary tuning location and user activity tracking may be performed while still maintaining complete anonymity. Alternatively, all or portions of the user-specific (albeit anonymous) information may be stripped off before storage of the activity or configuration data within the historical database. See, e.g., co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, for exemplary implementation of such anonymous mechanisms. Accordingly, the MSO (or ICGW 200 itself) can evaluate individual CPE 106 according to an activity, preference, or configuration analysis gleaned from that particular CPE (i.e., on a per-CPE basis) if desired.

Software Architecture—

Figure 10:
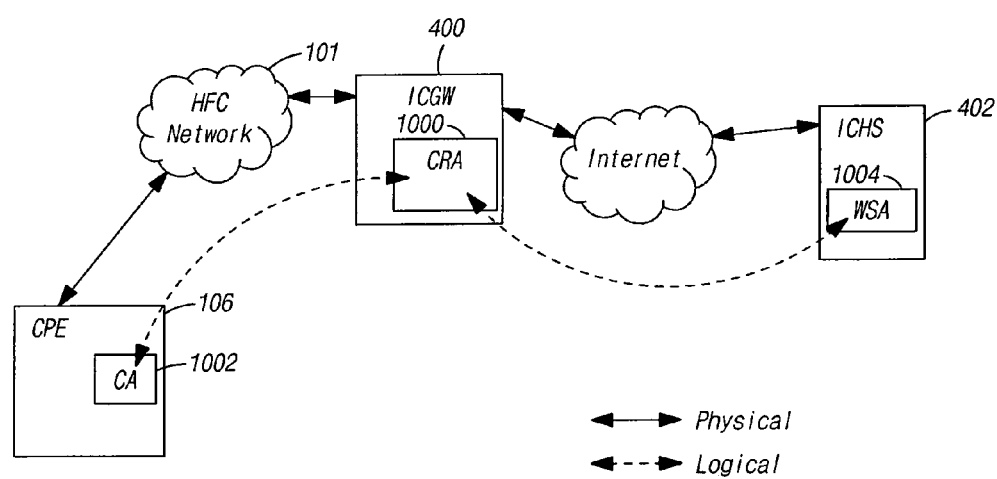
FIG. 10 is a graphical representation of one implementation of a software architecture useful with the present invention.

Referring now to FIG. 10, one exemplary implementation of a software architecture useful with the present invention is described. As shown, the ICGW 400 (or VOD server/ICGW 400*a*) runs a codec and re-encapsulation application (CRA) 1000. Although illustrated as a single application, it will be appreciated that the CRA 1000 may comprise more than one application or module, each application/module performing one of the functions discussed herein. The CRA 1000 is in logical communication with a client application (CA) 1002 and a web server application (WSA) 1004.

The CA 1002 is run on the CPE 106; the CA 1002 provides a user with a VOD, electronic program guide (EPG), or dedicated interface from which the user may select one or more content elements for viewing. In one embodiment, the VOD and/or EPG interfaces are populated based on the previously described rules. The CA 1002 then transmits the user request to the CRA 1000.

Where the CPE 106 utilizes a VOD interface, a VOD a session may be established via the CPE's VOD client or software and the SRM (not shown). The content request from the CA 1002 is transmitted to the CRA 1000, which then requests the content from the WSA 1004. Alternatively, the content listed on the VOD interface (e.g., presented as available to a user) may be pre-requested and received from the WSA 1004, and stored locally at a network entity associated with the ICGW 400 (or VOD server/ICGW 400*a*).

Content presented to the user in an EPG may be provided using for example broadcast switched mechanisms (as discussed above). In one embodiment, content listed in an EPG is flooded to a network switch of the HFC network 101. It may then be broadcast to the CPE 106 on one or more program channels according to a schedule (i.e., assuming at least subscriber in the service group serviced by that switch is tuned to that program channel).

In one variant, the content delivered to at the switch may be decoded and re-encoded (whether upstream of the switch, or even at the switch itself) to a codec compatible with legacy CPE 106 in the network (such as e.g., MPEG-2). In this manner, all CPE 106 (whether legacy or advanced) will be able to decode the content.

In another variant, the internet content channel on the EPG may be dedicated to only content presented in its original codec (e.g., H.264). In this instance, a user would only be able to access the content if they use an advanced CPE 106 (i.e., one with an H.264 decoder), or had the ability to transcode indigenously within their CPE.

Selective Transcoding—

As noted above, a container is a wrapper (or multiplexer) for audio and video contents; a container can be easily de-multiplexed then re-multiplexed to another container format without re-encoding the contents. However, the codecs used to encode the contents must be re-encoded in order to be played on the a CPE 106 if the original content encoding is not supported by the CPE 106. De-packaging and re-packaging (e.g., demultiplexing and re-encapsulating) alone is generally much more desirable than performing the de-packaging and re-packaging steps along with transcoding, since: (i) the native or original internet codec (e.g., H.264) is a more efficient codec in terms of bandwidth consumption than an MPEG-2 or other codec; (ii) bandwidth consumption aside, transcoding consumes time and much CPU overhead; and (iii) transcoding is generally a lossy process, and hence the quality of the transcoded content may be somewhat degraded. However, a legacy device requesting the content will typically not have the native (e.g., H.264) codec, and hence the MSO is given the choice of not providing the content to the user of the legacy device, or transcoding into a legacy-compatible format. Since the latter option is generally desirable, a method is needed for determining when such transcoding should be performed.

Accordingly, FIG. 11 illustrates one embodiment of such a method 1100 for determining whether transcoding of (internet) content is required.

Per step 1102 of the method 1100, a request for content is received at the gateway device 400, 400a. The request contains information identifying the requesting device (CPE 106). For example, the request may contain the CPE's MAC address, IP address, a serial number or other info, or even a subscriber account number (which can then be used to cross-reference the MSO's records to determine the type and/or configuration of the CPE for that account), etc.

The gateway apparatus 400, 400a includes logic to determine, based on the identification information, whether the device 106 is capable of reading the content in its original codec (step 1104). For example, a "legacy" model CPE 106 may not be adapted to read H.264 encoded content, whereas an "advanced" model may be able to perform such decoding. Making this determination and only transcoding when necessary saves bandwidth (since H.264 encoded content uses less bandwidth than MPEG-2, etc.) and processing overhead, and enhances user experience as noted above.

In one embodiment, the ICGW 400 (or VOD server/ICGW 400a) compares the identification information received in the content request to identification information found in MSO records or an MSO database which correlates the device to its capabilities. This may be the same record referenced above, or a separate record maintained by the MSO or even a third party. For example, a range of MAC addresses might be known by the MSO to correlate to a Model XYZ set-top box having a prescribed set of capabilities. Alternatively, the CPE 106 decoding capabilities may be presented to the gateway device 400, 400a via profile sent from the CPE 106 (either automatically at set-up, or upon request), thereby indicating to the ICGW the device-specific capabilities of that particular requesting CPE (e.g., which may have been modified with respect to a nominal or baseline configuration).

If it is determined that that the CPE 106 is an advanced CPE 106, i.e., it supports the original content encoding, the gateway device 400, 400a need only perform de-packetization and re-packetization. Thus, at step 1106, the ICGW 400 (or VOD server/ICGW 400a) de-encapsulates the content from the first media container. Next, per step 1108, the ICGW 400 (or VOD server/ICGW 400a) determines a compatible encapsulation type. As above, the ICGW 400 (or VOD server/ICGW 400a) may determine an appropriate encapsulation based on information obtained from a CPE 106 profile, or by a search of MSO records given the CPE 106 identification information (e.g., MAC or IP address). Per step 1110, the ICGW 400 (or VOD server/ICGW 400a) re-encapsulates the content according to the supported container format. The re-encapsulated content may then be streamed to the CPE 106 (step 1112).

Alternatively, if it is determined that the requesting CPE 106 does not support the codec of the original content, the content is first de-encapsulated (step 1114) and subsequently decoded (step 1116). At step 1118, a compatible encapsulation format and codec are determined. As noted previously, the ICGW 400 (or VOD server/ICGW 400a) may determine appropriate encapsulation format and codec based on information contained in a CPE 106 profile, or in information obtained from MSO records. For example, a legacy CPE 106 may be capable of decoding MPEG-2 content received via an MPEG-2 transport. Next, at step 1120, the content is re-encoded to one of a set of codecs previously determined to be compatible with the CPE 106. In one example, the content is re-encoded from 11.264 to MPEG-2. At step 1122, the content is re-encapsulated (such as to MPEG-2 transport) and streamed to the CPE 106 (step 1124).

In another embodiment, a bandwidth conservation manager process may be utilized to intelligently determine how to prioritize and/or service requests based on one or more factors such as subscription level, capabilities, etc., such as in situations of bandwidth or other resource contention. For instance, in one variant, requests from a premium subscriber with an advanced CPE 106 would be serviced first, since the customer is a higher tier subscriber and the subscriber's CPE 106 consumes less bandwidth for the same content delivery. In another variant, all users with legacy CPE 106 may be allocated bandwidth on an as-available basis; i.e., would be serviced after all users with advanced CPE 106, or all premium users regardless of CPE 106 type. Other rules for the allocation of services may be utilized as well.

In yet another embodiment, the ICGW 400 (or VOD server/ICGW 400a) can use CPE 106 profile data to determine which of two or more transcoding options uses least overhead and/or bandwidth for delivery and can optimize based thereon as discussed in co-owned, co-pending U.S. patent application Ser. No. 11/726,095 filed on Mar. 20, 2007 and entitled "Method and Apparatus for Content Delivery and Replacement In a Network", incorporated herein by reference in its entirety.

Business Methods and "Rules" Engine—

In another aspect of the invention, the aforementioned internet content delivery process (e.g., rendered as one or more computer programs) optionally includes an operations and/or business rules engine. This engine comprises, in an exemplary embodiment, a series of software routines running on a network device or other associated hardware/firmware environment that are adapted to control the delivery of the internet content. These rules may also be fully integrated within the delivery process itself, and controlled via e.g., a GUI on a PC connected to the network device or CPE 106. In effect, the rules engine comprises a supervisory entity which monitors and selectively controls the delivery of internet content so as to implement desired operational or business rules.

The rules engine, when imposed, can be used to dynamically (or manually) control the delivery of Internet content and/or client application 910 (e.g., access to and services available via the internet content portal).

For example, one rule implemented by the rules engine may comprise selectively servicing (or at least queuing first) internet content requests from certain users first; e.g., those with a higher subscription priority or level under bandwidth-limited cases, and only after this tier of users is satisfied, servicing any remaining content requests. In one variant, subscribers are divided into tiers (a hierarchy), and certain tiers of the hierarchy are serviced to a prescribed level first. For instance, one rule might impose a requirement that all "premium" subscribers have their internet content requests serviced before lower-tier subscribers.

As another example, the failure of a network component, or loss of an internet content source (e.g., ICHS 202), might render certain options unachievable (or at least undesirable due to factors such as high cost burden, high delivery latency, poor video quality, etc.). Hence, the rules engine can in such cases be used to mask or remove the affected options or inputs to the ICGW algorithm during the affected periods of time.

In one embodiment, internet content providers pay a premium or provide other incentives to the MSO to have particular content prioritized over others targeted or available for recommendation to the same demographic.

Similarly, a more incremental approach can be applied, such as where various ones of internet content are "graded" based on profit/revenue and/or operational considerations (i.e., those which earn most and/or give highest user satisfaction, etc. receive a higher grade), and the bitrate allocated based on such grade(s).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. For use in a content-based network having a plurality of client devices in communication therewith, a method of re-encapsulating internet content from Moving Picture Experts Group (MPEG)-4 (MP4) encapsulation format to Moving Picture Experts Group (MPEG)-2 (MPEG2) encapsulation format in order to utilize said content on at least one consumer premises equipment (CPE), said method comprising:

receiving a plurality of programs in an MP4 format container;

generating a program map table (PMT) and a program association table (PAT) of said programs;

extracting information from one or more International Standardization Organization (ISO) boxes of said MP4 container;

extracting from said MP4 container a plurality of elementary streams using information contained in one or more ISO boxes of said MP4 container;

encapsulating said elementary streams into a packetized format suitable for MPEG-2 transmission, said act of encapsulating comprising utilizing said extracted information to add sync words, sequence headers and picture headers;

multiplexing said packetized elementary streams into a previously generated MPEG-2 multiple program transport stream; and delivering said MPEG-2 transport stream to said at least one CPE.

2. The method of claim 1, wherein said plurality of programs received in said MP4 container are received via an Internet from at least one host server.

3. The method of claim 1, wherein said internet content comprises H.264-encoded video content and advanced audio coding (AAC) encoded audio content.

4. The method of claim 1, further comprising generating a list of a plurality of programs available in a transport stream.

5. The method of claim 4, wherein said list further comprises a program number for each of said plurality of programs.

6. The method of claim 1, wherein each of said plurality of programs comprises an associated packet identifier for each of a plurality of packets associated therewith, said method further comprising generating a list of each packet identifier for each of said plurality of packets associated with individual ones of said plurality of programs.

7. The method of claim 1, wherein said act of extracting said information comprises extracting at least one of: header information derived from said one or more ISO boxes, and timing information derived from said one or more ISO boxes.

8. The method of claim 1, wherein said act of extracting said one or more elementary streams comprises de-multiplexing and recreating said one or more elementary streams.

9. The method of claim 1, wherein said act of de-multiplexing comprises de-multiplexing said one or more elementary streams using said information contained in said one or more ISO boxes.

10. The method of claim 1, further comprising adding decoding/presentation time stamps (DTS/PTS) and program clock reference (PCR) information.

11. The method of claim 1, wherein said act of multiplexing said packetized elementary streams into said previously generated MPEG-2 multiple program transport stream comprises multiplexing according to an MPEG-2 buffer and timing model.

12. The method of claim 1, wherein said act of multiplexing said packetized elementary streams into said previously generated MPEG-2 multiple program transport stream comprises inserting null packets to create at least one constant bitrate (CBR) stream.

13. A method of re-encapsulating internet content for use on a premises device within a content based network having a plurality of premises devices in communication therewith, said method comprising:

generating a list of a plurality of programs available in a transport stream;

extracting information for use in generating a Moving Picture Experts Group (MPEG)-2 (MPEG2) header from a data portion of individual ones of a plurality of elementary streams associated to respective ones of said plurality of programs;

extracting one or more of said plurality of elementary streams, at least one of said elementary streams comprising frameless non-legacy MPEG-4 (MP4) content;

encapsulating said non-legacy content with an MPEG-2 encapsulation;

packetizing said encapsulated non-legacy content using a header generated from said extracted information and comprising at least sync words, sequence headers and picture headers; and generating a multiplex transport stream comprising said MPEG-2 encapsulated non-legacy MPEG-4 content and legacy MPEG-2 content.

14. The method of claim 13, wherein said list further comprises a program number for each of said plurality of programs.

15. The method of claim 13, wherein each of said plurality of programs comprises an associated packet identifier for each of a plurality of packets associated therewith, and said method further comprises generating a list of each packet identifier for each of said plurality of packets associated with individual ones of said plurality of programs.

16. The method of claim 13, wherein said information comprises header information derived from one or more ISO boxes of an MP4 file.

17. The method of claim 13, wherein said information comprises timing information derived from one or more ISO boxes of an MP4 file.

18. The method of claim 13, wherein said act of extracting said one or more elementary streams comprises de-multiplexing and recreating said one or more elementary streams.

19. The method of claim 18, wherein said act of de-multiplexing comprises de-multiplexing said one or more elementary streams using information contained in one or more ISO boxes of an MP4 file.

20. The method of claim 13, further comprising adding decoding/presentation time stamps (DTS/PTS) and program clock reference (PCR) information.

21. The method of claim 13, wherein said act of generating a multiplex transport stream comprises multiplexing according to an MPEG-2 buffer and timing model.

22. The method of claim 13, wherein said act of generating a multiplex transport stream comprises inserting null packets to create at least one constant bitrate (CBR) stream.

23. A gateway apparatus for use in delivery of Moving Picture Experts Group (MPEG)-4 (MP4) content to one or more of a plurality of consumer premises equipment (CPE) in communication therewith via a delivery network, said gateway apparatus comprising:
  a first interface configured to communicate with said delivery network;
  a second interface configured to communicate with one or more host servers via an internetwork; and
  a digital processor configured to communicate with said first and second interfaces and configured to execute at least one computer program thereon, said computer program comprising a plurality of instructions which are configured to, when executed:
    receive said MP4 content;
    de-encapsulate said MP4 content;
    transcode a data portion of said MP4 content from a first codec to a second codec, said second codec comprising a codec which is compatible with at least one of said one or more plurality of CPE;
    re-encapsulate said content to MPEG-2 encapsulation for transport over said delivery network, said re-encapsulation comprising an addition of sync words, sequence headers, and picture headers extracted from a data portion of individual ones of a plurality of elementary streams associated to respective ones of said MP4 content; and
    deliver a multiplex comprising said MPEG-2 encapsulated content to said one or more of said plurality of CPE via said delivery network.

24. The apparatus of claim 23, wherein said first interface comprises a radio frequency tuner configured to send and receive in-band and out-of-band signals.

25. The apparatus of claim 24, wherein said plurality of instructions are further configured to when executed receive a request for specific internet content from at least one of said plurality of CPE and request said specific internet content from said one or more host servers.

26. The apparatus of claim 25, wherein said request comprises a request transmitted to said apparatus via an out-of-band signal, and said delivery of said content comprises delivery via an in-band signal.

27. The apparatus of claim 23, wherein said plurality of instructions are further configured to when executed request content periodically according to one or more rules.

28. The apparatus of claim 27, wherein said delivery of said content comprises broadcast delivery to more than one of said plurality of CPE simultaneously and according to a predetermined schedule, said schedule being related at least in part to said periodicity.

29. The apparatus of claim 23, wherein said MPEG-2 encapsulated content is stored at a storage entity associated with said gateway apparatus.

30. The apparatus of claim 29, wherein said plurality of instructions are further configured to when executed enable on-demand content deliver functionality of said stored content, said delivery comprising on-demand delivery to at least one of said plurality of CPE.

31. The apparatus of claim 29, wherein said first network interface is further configured to enable said apparatus to communicate with at least one session resource manager (SRM), said SRM configured to enable an on-demand session between said gateway apparatus and at least one of said plurality of CPE for said delivery of content thereto.

32. The apparatus of claim 23, wherein said plurality of instructions are further configured to when executed:
  generate a list of a plurality of programs available in a first transport comprising said MP4 content;
  extract one or more elementary streams from said first transport;
  packetize said elementary streams; and
  multiplex said packetized elementary streams to a second transport, said second transport comprising an encapsulation format usable by one or more of said plurality of CPE.

33. The apparatus of claim 23, wherein said first format comprises H.264, said second format comprises one of: (i) Real, (ii) Windows Media; and (iii) MPEG-2.

* * * * *